United States Patent
Fisher et al.

(10) Patent No.: US 11,354,792 B2
(45) Date of Patent: Jun. 7, 2022

(54) SYSTEM AND METHODS FOR MODELING CREATION WORKFLOWS

(71) Applicant: ADOBE INC., San Jose, CA (US)

(72) Inventors: Matthew David Fisher, San Carlos, CA (US); Hung-Yu Tseng, Santa Clara, CA (US); Yijun Li, San Jose, CA (US); Jingwan Lu, Santa Clara, CA (US)

(73) Assignee: Adobe Inc., San Jose, CA (US)

( * ) Notice: Subject to any disclaimer, the term of this patent is extended or adjusted under 35 U.S.C. 154(b) by 204 days.

(21) Appl. No.: 16/785,437

(22) Filed: Feb. 7, 2020

(65) Prior Publication Data

US 2021/0248727 A1    Aug. 12, 2021

(51) Int. Cl.
| | | |
|---|---|---|
| G06T 5/50 | (2006.01) |
| G06N 3/08 | (2006.01) |
| G06N 3/04 | (2006.01) |
| G06N 20/20 | (2019.01) |
| G06N 5/04 | (2006.01) |

(52) U.S. Cl.
CPC .............. *G06T 5/50* (2013.01); *G06N 3/0454* (2013.01); *G06N 3/084* (2013.01); *G06N 5/046* (2013.01); *G06N 20/20* (2019.01); *G06T 2207/20081* (2013.01); *G06T 2207/20084* (2013.01)

(58) Field of Classification Search
CPC ............. G06T 5/50; G06T 2207/20081; G06T 2207/20084; G06N 3/0454; G06N 3/084; G06N 20/20; G06N 5/046
USPC ....................................................... 382/155
See application file for complete search history.

(56) References Cited

U.S. PATENT DOCUMENTS 10,839,955 B2 * 11/2020 Accomazzi ........... G06T 7/0012
2020/0242774 A1 * 7/2020 Park ....................... G06N 20/10

OTHER PUBLICATIONS

Abdal, R., Qin, Y., & Wonka, P. (2019). Image2StyleGAN: How to Embed Images Into the StyleGAN Latent Space?. In Proceedings of the IEEE International Conference on Computer Vision (pp. 4432-4441).
Arjovsky, M., Chintala, S., & Bottou, L. (2017). Wasserstein gan. arXiv preprint arXiv:1701.07875.

(Continued)

*Primary Examiner* — Juan A Torres
(74) *Attorney, Agent, or Firm* — Shook, Hardy & Bacon L.L.P.

(57) ABSTRACT

Technologies for image processing based on a creation workflow for creating a type of images are provided. Both multi-stage image generation as well as multi-stage image editing of an existing image are supported. To accomplish this, one system models the sequential creation stages of the creation workflow. In the backward direction, inference networks can backward transform an image into various intermediate stages. In the forward direction, generation networks can forward transform an earlier-stage image into a later-stage image based on stage-specific operations. Advantageously, this technical solution overcomes the limitations of the single-stage generation strategy with a multi-stage framework to model different types of variation at various creation stages. Resultantly, both novices and seasoned artists can use these technologies to efficiently perform complex artwork creation or editing tasks.

20 Claims, 10 Drawing Sheets
(6 of 10 Drawing Sheet(s) Filed in Color)

(56) References Cited

OTHER PUBLICATIONS

Balaji, Y., Sankaranarayanan, S., & Chellappa, R. (2018). Metareg: Towards domain generalization using meta-regularization. In Advances in Neural Information Processing Systems (pp. 998-1008).
Bau, D., Strobelt, H., Peebles, W., Wulff, J., Zhou, B., Zhu, J. Y., & Torralba, A. (2019). Semantic photo manipulation with a generative image prior. ACM Transactions on Graphics (TOG), 38(4), 1-11.
Brock, A., Donahue, J., & Simonyan, K. (2018). Large scale gan training for high fidelity natural image synthesis. arXiv preprint arXiv:1809.11096.
Chang, Angel X., et al. "Shapenet: An information-rich 3d model repository." arXiv preprint arXiv:1512.03012 (2015).
Chang, H., Lu, J., Yu, F., & Finkelstein, A. (2018). Pairedcyclegan: Asymmetric style transfer for applying and removing makeup. In Proceedings of the IEEE Conference on Computer Vision and Pattern Recognition (pp. 40-48).
Chen, W., & Hays, J. (2018). Sketchygan: Towards diverse and realistic sketch to image synthesis. In Proceedings of the IEEE Conference on Computer Vision and Pattern Recognition (pp. 9416-9425).
Chen, X., Duan, Y., Houthooft, R., Schulman, J., Sutskever, I., & Abbeel, P. (2016). Infogan: Interpretable representation learning by information maximizing generative adversarial nets. In Advances in neural information processing systems (pp. 2172-2180).
Donahue, J., & Simonyan, K. (2019). Large scale adversarial representation learning. In Advances in Neural Information Processing Systems (pp. 10541-10551).
Ghiasi, G., Lin, T. Y., & Le, Q. V. (2018). Dropblock: A regularization method for convolutional networks. In Advances in Neural Information Processing Systems (pp. 10727-10737).
Ghosh, A., Zhang, R., Dokania, P. K., Wang, O., Efros, A. A., Torr, P. H., & Shechtman, E. (2019). Interactive sketch & fill: Multiclass sketch-to-image translation. In Proceedings of the IEEE International Conference on Computer Vision (pp. 1171-1180).
Goodfellow, I., Pouget-Abadie, J., Mirza, M., Xu, B., Warde-Farley, D., Ozair, S., . . . & Bengio, Y. (2014). Generative adversarial nets. In Advances in neural information processing systems (pp. 2672-2680).
Heusel, M., Ramsauer, H., Unterthiner, T., Nessler, B., & Hochreiter, S. (2017). Gans trained by a two time-scale update rule converge to a local nash equilibrium. In Advances in neural information processing systems (pp. 6626-6637).
Huang, X., & Belongie, S. (2017). Arbitrary style transfer in real-time with adaptive instance normalization. In Proceedings of the IEEE International Conference on Computer Vision (pp. 1501-1510).
Huang, X., Liu, M. Y., Belongie, S., & Kautz, J. (2018). Multimodal unsupervised image-to-image translation. In Proceedings of the European Conference on Computer Vision (ECCV) (pp. 172-189).
Hung, W. C., Zhang, J., Shen, X., Lin, Z., Lee, J. Y., & Yang, M. H. (2018). Learning to blend photos. In Proceedings of the European Conference on Computer Vision (ECCV) (pp. 70-86).
Izuka, S., Simo-Serra, E., & Ishikawa, H. (2016). Let there be color! Joint end-to-end learning of global and local image priors for automatic image colorization with simultaneous classification. ACM Transactions on Graphics (ToG), 35(4), 1-11.
Isola, P., Zhu, J. Y., Zhou, T., & Efros, A. A. (2017). Image-to-image translation with conditional adversarial networks. In Proceedings of the IEEE conference on computer vision and pattern recognition (pp. 1125-1134).
Johnson, J., Alahi, A., & Fei-Fei, L. (Oct. 2016,). Perceptual losses for real-time style transfer and super-resolution. In European conference on computer vision (pp. 694-711). Springer, Cham.
Karras, T., Aila, T., Laine, S., & Lehtinen, J. (2017). Progressive growing of gans for improved quality, stability, and variation. arXiv preprint arXiv:1710.10196.

Karras, T., Laine, S., & Aila, T. (2019). A style-based generator architecture for generative adversarial networks. In Proceedings of the IEEE Conference on Computer Vision and Pattern Recognition (pp. 4401-4410).
Krogh, A., & Hertz, J. A. (1992). A simple weight decay can improve generalization. In Advances in neural information processing systems (pp. 950-957).
Larsen, A. B. L., Sønderby, S. K., Larochelle, H., & Winther, O. (2015). Autoencoding beyond pixels using a learned similarity metric. arXiv preprint arXiv:1512.09300.
Larsson, G., Maire, M., & Shakhnarovich, G. (Oct. 2016,). Learning representations for automatic colorization. In European Conference on Computer Vision (pp. 577-593) Springer, Cham.
Larsson, G., Maire, M., & Shakhnarovich, G. (2016). Fractalnet: Ultra-deep neural networks without residuals. arXiv preprint arXiv:1605.07648.
Lee, C. H., Liu, Z., Wu, L., & Luo, P. (2019). MaskGAN: towards diverse and interactive facial image manipulation. arXiv preprint arXiv:1907.11922.
Lee, H. Y., Tseng, H. Y., Mao, Q., Huang, J. B., Lu, Y. D., Singh, M., & Yang, M. H. (2020). Drit++: Diverse image-to-image translation via disentangled representations. International Journal of Computer Vision, 1-16.
Li, Y., Liu, M. Y., Li, X., Yang, M. H., & Kautz, J. (2018). A closed-form solution to photorealistic image stylization. In Proceedings of the European Conference on Computer Vision (ECCV) (pp. 453-468).
Nazeri, K., Ng, E., Joseph, T., Qureshi, F. Z., & Ebrahimi, M. (2019). Edgeconnect: Generative image inpainting with adversarial edge learning. arXiv preprint arXiv:1901.00212.
Park, T., Liu, M. Y., Wang, T. C., & Zhu, J. Y. (2019). Semantic image synthesis with spatially-adaptive normalization. In Proceedings of the IEEE Conference on Computer Vision and Pattern Recognition (pp. 2337-2346).
Pathak, D., Krahenbuhl, P., Donahue, J., Darrell, T., & Efros, A. A. (2016). Context encoders: Feature learning by inpainting. In Proceedings of the IEEE conference on computer vision and pattern recognition (pp. 2536-2544).
Portenier, T., Hu, Q., Szabo, A., Bigdeli, S. A., Favaro, P., & Zwicker, M. (2018). Faceshop: Deep sketch-based face image editing. ACM Transactions on Graphics (TOG), 37(4), 99.
Singh, K. K., Ojha, U., & Lee, Y. J. (2019). Finegan: Unsupervised hierarchical disentanglement for fine-grained object generation and discovery. In Proceedings of the IEEE Conference on Computer Vision and Pattern Recognition (pp. 3490-6499).
Song, S., Zhang, W., Liu, J., & Mei, T. (2019). Unsupervised person image generation with semantic parsing transformation. In Proceedings of the IEEE Conference on Computer Vision and Pattern Recognition (pp. 2357-2366).
Srivastava, N., Hinton, G., Krizhevsky, A., Sutskever, I., & Salakhutdinov, R. (2014). Dropout: a simple way to prevent neural networks from overfilling. The journal of machine learning research, 15(1), 1929-1958.
Wang, T. C., Liu, M. Y., Zhu, J. Y., Tao, A., Kautz, J., & Catanzaro, B. (2018). High-resolution image synthesis and semantic manipulation with conditional gans. In Proceedings of the IEEE conference on computer vision and pattern recognition (pp. 8798-8807).
Zhang, H., Xu, T., Li, H., Zhang, S., Wang, X., Huang, X., & Metaxas, D. N. (2018). Stackgan++: Realistic image synthesis with stacked generative adversarial networks. IEEE transactions on pattern analysis and machine intelligence, 41(8), 1947-1962.
Zhang, R., Isola, P., & Efros, A. A. (Oct. 2016,). Colorful image colorization. In European conference on computer vision (pp. 649-666). Springer, Cham.
Zhang, R., Zhu, J. Y., Isola, P., Geng, X., Lin, A. S., Yu, T., & Efros, A. A. (2017). Real-time user-guided image colorization with learned deep priors. arXiv preprint arXiv:1705.02999.
Zhu, J. Y., Krähenbuhl, P., Shechtman, E., & Efros, A. A. (Oct. 2016,). Generative visual manipulation on the natural image manifold. In European Conference on Computer Vision (pp. 597-613). Springer, Cham.
Zhu, J. Y., Park, T., Isola, P., & Efros, A. A. (2017). Unpaired image-to-image translation using cycle-consistent adversarial net-

(56) References Cited

OTHER PUBLICATIONS works. In Proceedings of the IEEE international conference on computer vision (pp. 2223-2232).

Zhu, J. Y., Zhang, R., Pathak, D., Darrell, T., Efros, A. A., Wang, O., & Shechtman, E. (2017). Toward multimodal image-to-image translation. In Advances in neural information processing systems (pp. 465-476).

Zhu, J. Y., Zhang, Z., Zhang, C., Wu, J., Torralba, A., Tenenbaum, J., & Freeman, B. (2018). Visual object networks: Image generation with disentangled 3D representations. In Advances in neural information processing systems (pp. 118-129).

* cited by examiner

SYSTEM AND METHODS FOR MODELING CREATION WORKFLOWS

BACKGROUND

Modern digital technologies have transformed many artistic activities, such as painting and drawing, for film-making, advertising, desktop publishing, and many other industries. Digital art refers to an artistic practice that uses digital technologies as part of the creative process. By way of example, instead of using brushes and drying oil to paint on a canvas, a modern digital artist may use a digital brush or pen to paint on a graphics tablet. Further, digital image processing software have been developed to assist artists for creating digital art. For example, Adobe Illustrator® could be used for creating beautiful vector art and illustrations. Adobe Animate® could be used for designing interactive vector animations. Adobe Photoshop® could be used for editing and compositing photos, web and mobile app designs, 3D artwork, videos, and more.

Although the aforementioned digital drawing tools have greatly broadened the creative opportunities for both professional and casual artists, creating artwork from scratch remains a challenge for people who have not had years of artistic training or experience. People who are new to the world of art often desire to follow the typical creation workflow for producing artwork. Taking watercolor painting as an example, an artist may first sketch the outline with pencils, then fill out areas with large brushes, and lastly, finalize details such as the color gradient and shadow with small brushes. At different creation stages, different aspects of the overall design have to be determined and carried forward to the final art product.

However, when given a piece of completed art, e.g., a digital painting, it is difficult to modify any aspect of an intermediate stage in the digital painting's creation workflow. An artist usually has no way to modify a piece of art when the information of those intermediate creation stages is unavailable. A new technical solution is needed to recover the creation workflow for creating a type of digital artwork, so that various aspects of the digital artwork may be revisited and even repurposed for creating different digital artwork.

SUMMARY

This Summary is provided to introduce selected concepts that are further described below in the Detailed Description. This Summary is not intended to identify key features or essential features of the claimed subject matter, nor is it intended to be used as an aid in determining the scope of the claimed subject matter.

In general, this disclosure includes a technical solution for image processing based on the creation workflow of a type of artwork. To do that, the disclosed system models the sequential creation stages of the creation workflow. Specifically, the disclosed system is to use one or more inference networks to backward transform an image (e.g., a watercolor painting) into various intermediate stages according to the creation workflow for this particular type of images (e.g., the watercolor painting type). In the reverse direction, the disclosed system is to use one or more generation networks to forward transform an earlier-stage image into a later-stage image according to the order of the creation workflow.

Furthermore, the disclosed technologies also include an optimization process along with learning-based regularization to ensure that an output image (e.g., the edited image) produced by the disclosed system closely resembles the input image (e.g., the original image) in likeness and appearance. Accordingly, the disclosed technologies can enable various practical applications, such as multi-stage image generation or multi-stage image editing of an existing piece of art. Lastly, qualitative and quantitative results with various artistic datasets also demonstrate the effectiveness of the disclosed technologies.

In general, systems, methods, and computer-readable storage devices are provided to improve a computing system's ability for image processing in many aspects. Specifically, among the many aspects of technical characters described herein, one aspect of the technical characters includes a plurality of inference networks being operatively connected in a serial manner, a plurality of generation networks being operatively connected in a serial manner, and corresponding inference networks and generation networks being operatively connected in pairs via respective latent encoders. Resultantly, the technical effects include restoring an image back to any one of its intermediate stages according to its creation workflow, determining stage-specific latent representation of the image in respective stages of the creation workflow, and creating new images based on one or more of the stage-specific latent representations of the image.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The technologies described herein are illustrated by way of example and not limited by the accompanying figures in which like reference numerals indicate similar elements and in which.

DETAILED DESCRIPTION

Figure 1:
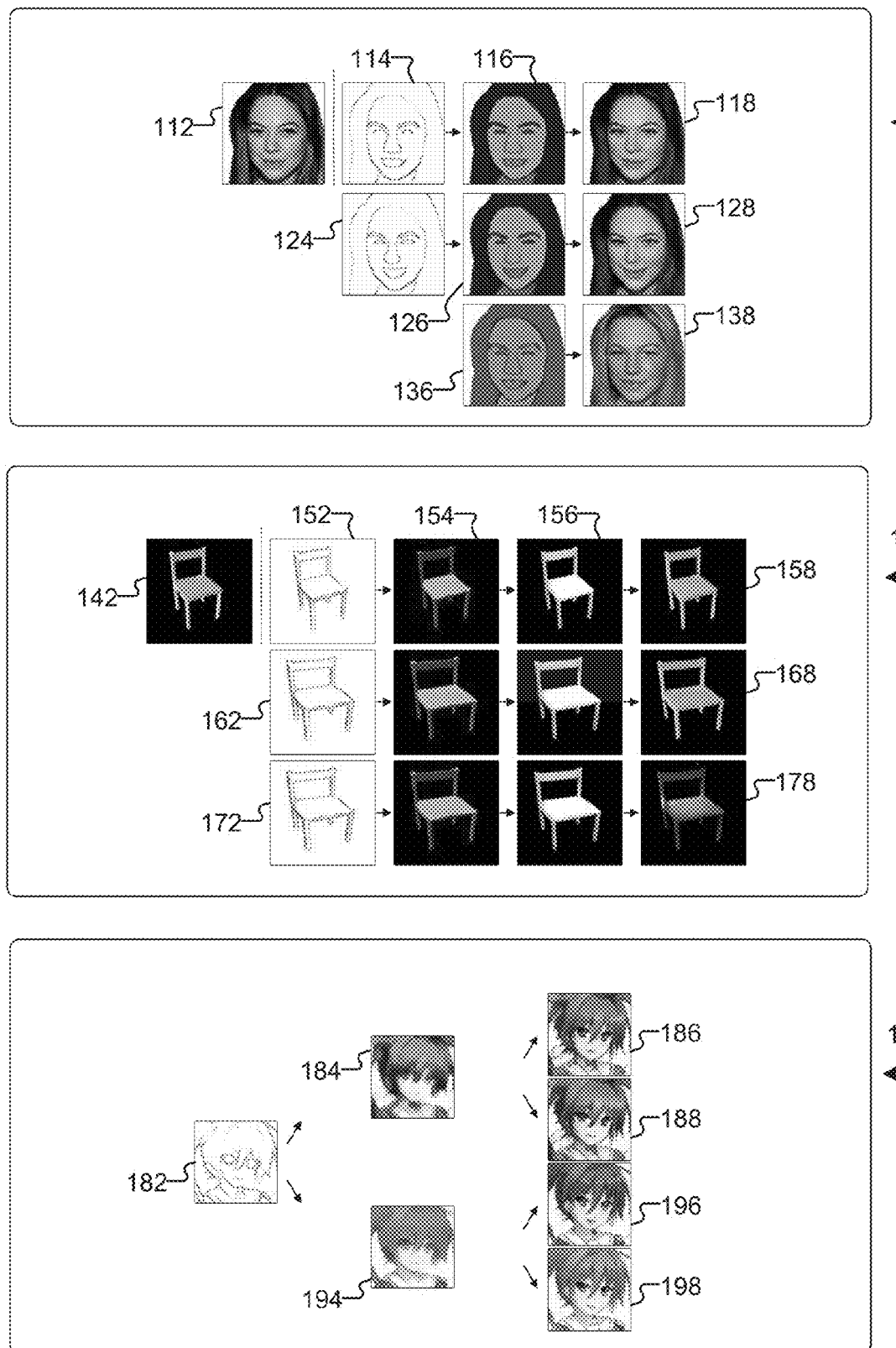
FIG. 1 depicts exemplary images, generated by an exemplary system, illustrating respective creation workflows, in accordance with at least one aspect of the technologies described herein.

The various technologies described herein are set forth with sufficient specificity to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described. Further, the term "based on" generally denotes that the succedent object, data, or information is used in performing the precedent action.

People often create art by following a creation workflow involving multiple creation stages. Typically, the creation workflow is unidirectional or irreversible. If an artist wishes to modify a decision made in an earlier creation stage, the artist may have to start over again because significant work may be required to propagate the new decision forward via intermediate stages to create the final artwork.

Generative adversarial networks (GANs) have been developed to produce an artwork according to user-provided in-put signals. Such systems can take user inputs, such as a sketch image or segmentation mask, and perform a single-step generation to synthesize a piece of final artwork. However, conventional GAN-based systems lack consideration for a creation workflow with multiple creation stages. Further, conventional editing schemes are either designed for specific applications or lack flexible controls over the editing process, e.g., due to their single-stage generation strategy. Accordingly, there are no effective technical solutions to edit an existing artwork image or create new artwork images based on stage-specific operations on a selected stage of a creation workflow.

In this disclosure, the creation workflow refers to the sequential steps took by an artist in creating a piece of art. The sequential steps may be divided into several sequential creation stages. In a creation stage, the artist is to accomplish a particular aspect of the art. By way of example, the creation workflow of watercolor painting may be divided into three sequential creation stages, namely sketch, flat coloring, and detail drawing. Sketch refers to the stage of the preliminary drawing for later elaboration. Flat coloring refers to the stage of adding solid color coverage with no texture, patterns, gradations, or other features. Detail drawing refers to the stage of adding details, such as texture, patterns, gradations, detailed styles, or other features.

In the image domain, the forward transformation refers to the process of deriving one image based on another image according to the natural order of the sequential creation stages, which lead to the final completed image, e.g., from sketch to flat coloring, from sketch to detail drawing, or from flat coloring to detail drawing. Conversely, the backward transformation refers to the process of deriving one image based on another image according to the reverse order of the sequential creation stages, e.g., from detail drawing to flat coloring, from flat coloring to sketch, or from detail drawing to sketch.

Figure 3:
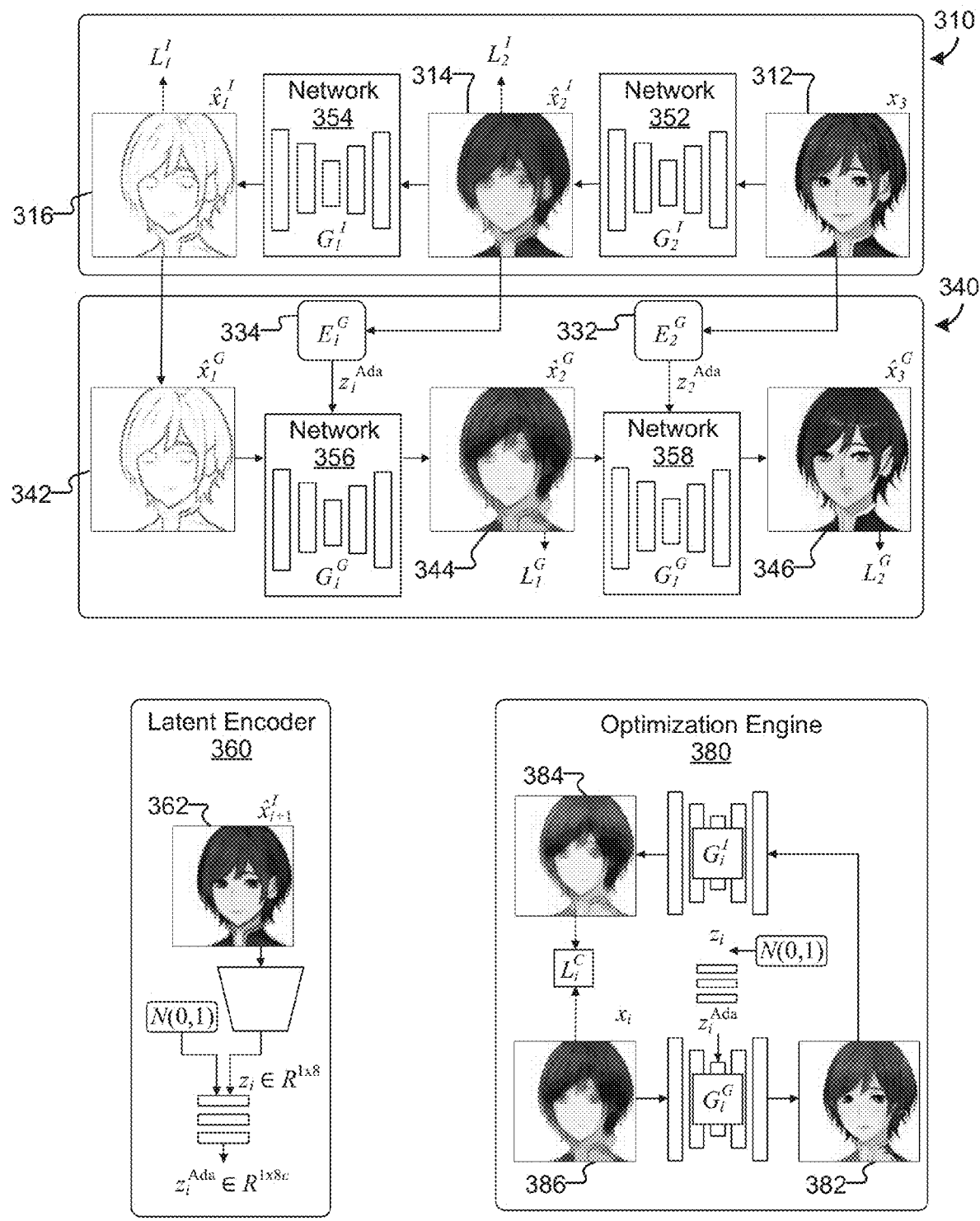
FIG. 3 is a schematic representation illustrating an exemplary system and related processes, in accordance with at least one aspect of the technologies described herein.

The disclosed technical solution here includes a generative model that follows an image-type-specific creation workflow. Specifically, the disclosed system is to use one or more inference networks to backward transform an image (e.g., a watercolor painting) into various intermediate stages (e.g., detailed drawing, flat coloring, sketch) according to the creation workflow for this particular type of images (e.g., the watercolor painting type), such as illustrated in FIG. 3. In the reverse direction, the disclosed system is to use one or more generation networks to forward transform an earlier-stage image into a later-stage image according to the order of the creation workflow, such as illustrated in FIG. 3.

Figure 2:
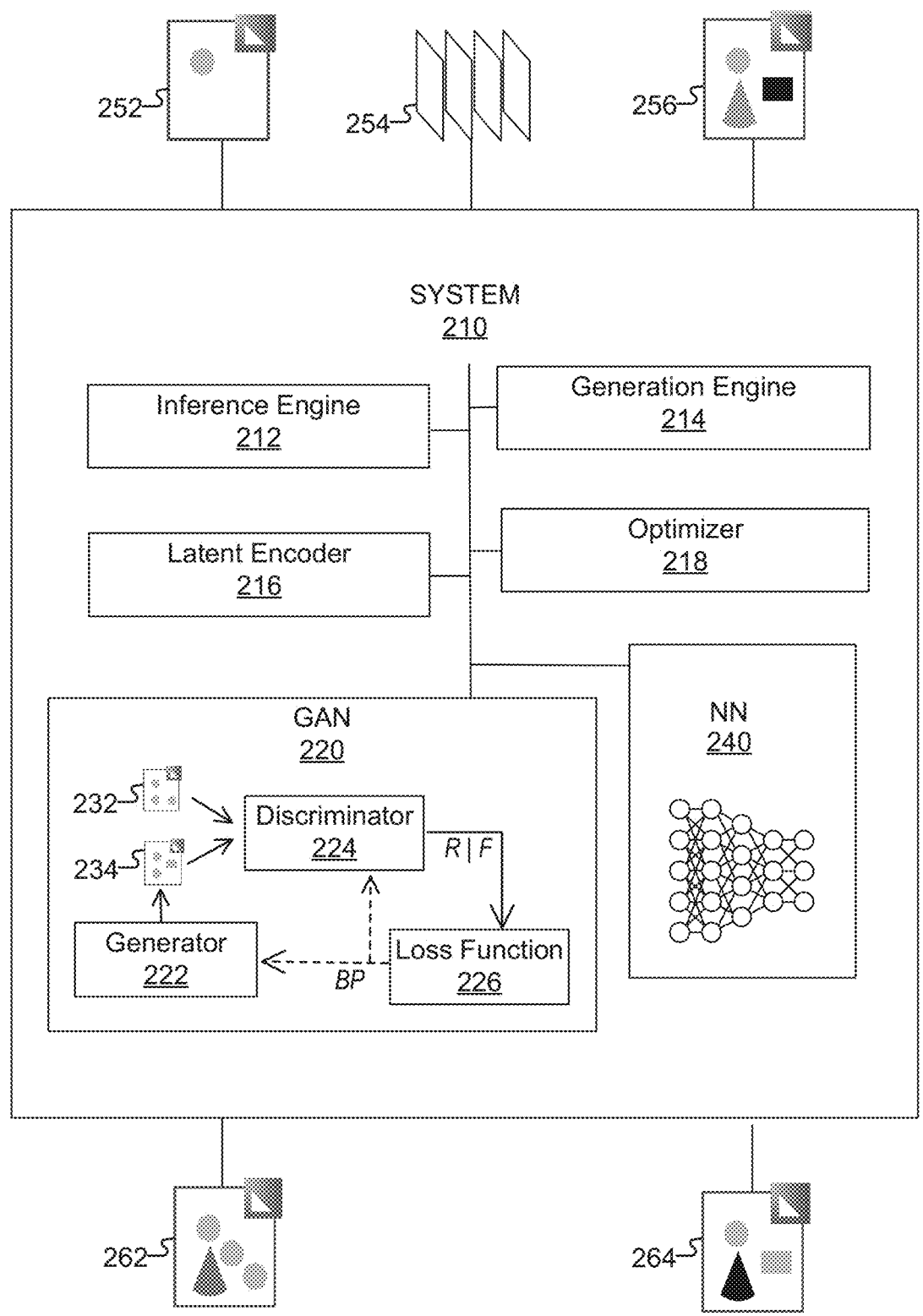
FIG. 2 is a schematic diagram of an exemplary system, in accordance with at least one aspect of the technologies described herein.
Figure 5:
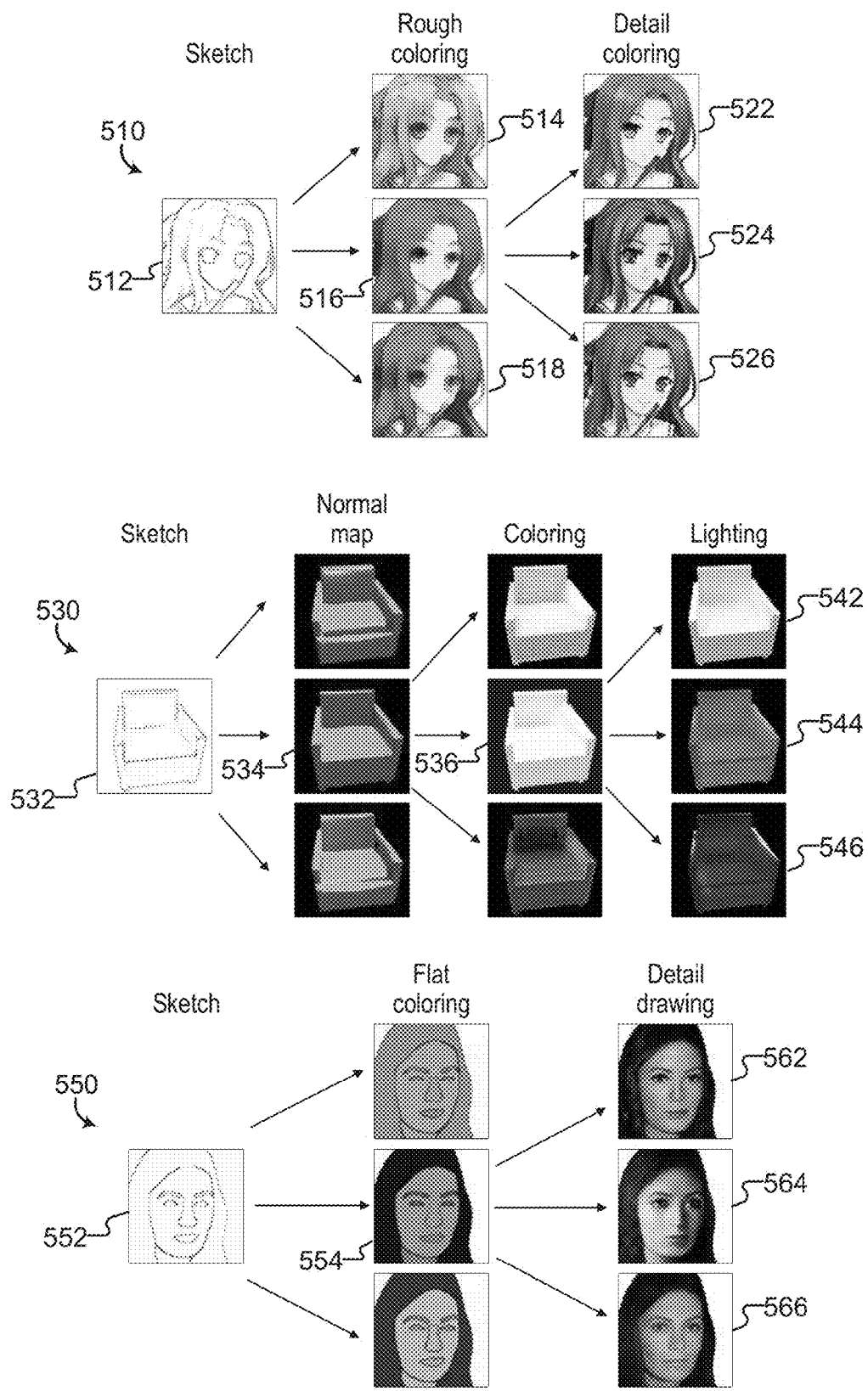
FIG. 5 depicts exemplary images, generated by an exemplary system, illustrating an exemplary image creation process, in accordance with at least one aspect of the technologies described herein.

In some embodiments, the disclosed system comprises of a generation engine and an inference engine, such as illustrated in FIG. 2. The generation engine learns to emulate each creation stage via a series of generation networks, e.g., improved multi-modal (i.e., one-to-many) conditional GAN networks, such as illustrated in FIG. 3. A stage-specific latent representation may be used to encode the variation presented at the corresponding creation stage, such as illustrated in FIG. 3. Accordingly, the generation engine may sample the stage-specific latent representation in order to introduce variations at the corresponding creation stage, such as illustrated in FIG. 5. Furthermore, during the image generation process, a user can determine the latent representation at each stage sequentially to control specific aspects of the synthesized final artwork image.

To enable editing an existing image, the inference engine learns to sequentially infer the intermediate images at corresponding intermediate creation stages from the existing image. In some embodiments, a series of improved uni-modal conditional GANs may be used to perform this inference, assuming a one-to-one mapping from a later stage image to an earlier stage image during the creation workflow.

Figure 10:
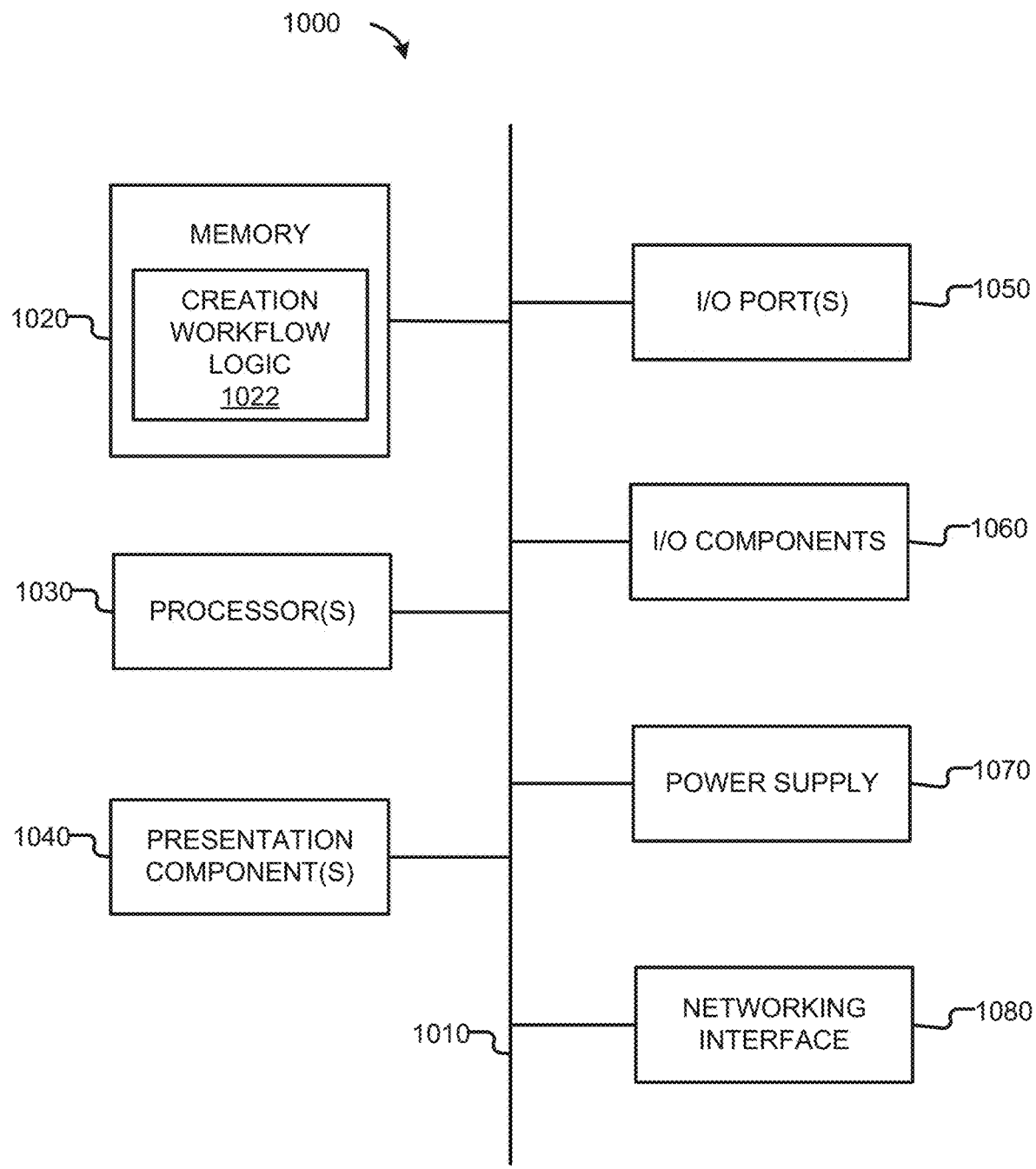
FIG. 10 is a block diagram of an exemplary computing environment suitable for implementing various aspects of the technologies described herein.

In one embodiment, the disclosed system predicts the stage-specific latent representations from the inferred images at all intermediate stages. Depending on the desired type of edit, the user can edit an intermediate image at any one of the intermediate stages or manipulate the stage-specific latent representation. Subsequently, the disclosed system can propagate the modification through the remaining creation stages, e.g., via the generation engine and based on the stage-specific latent representations, and synthesize a new image resembling the original image, but with the modifications or edited features, such as illustrated in FIG. 10.

Figure 8:
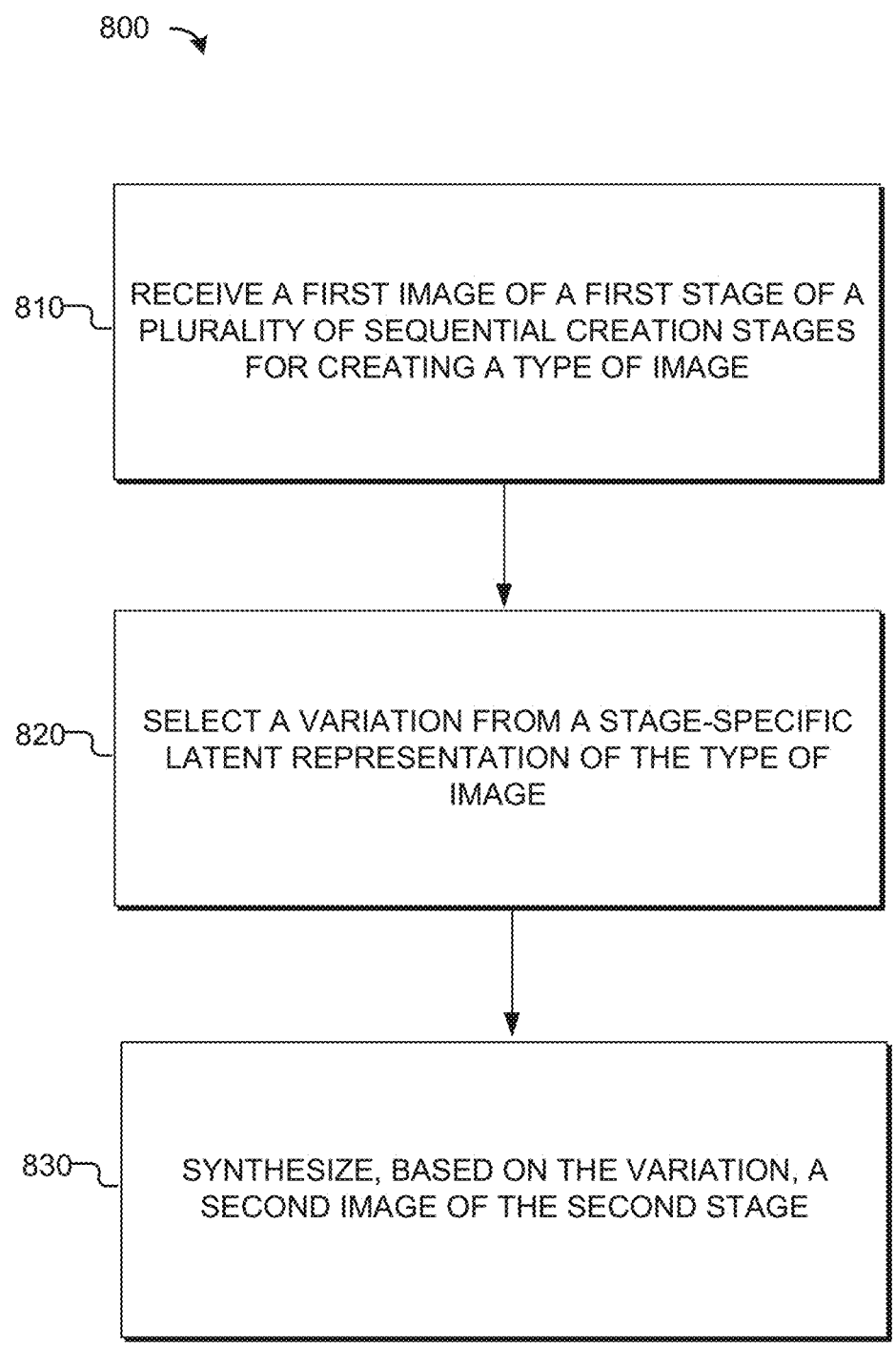
FIG. 8 is a flow diagram illustrating an exemplary process of synthesizing an image, in accordance with at least one aspect of the technologies described herein.
Figure 9:
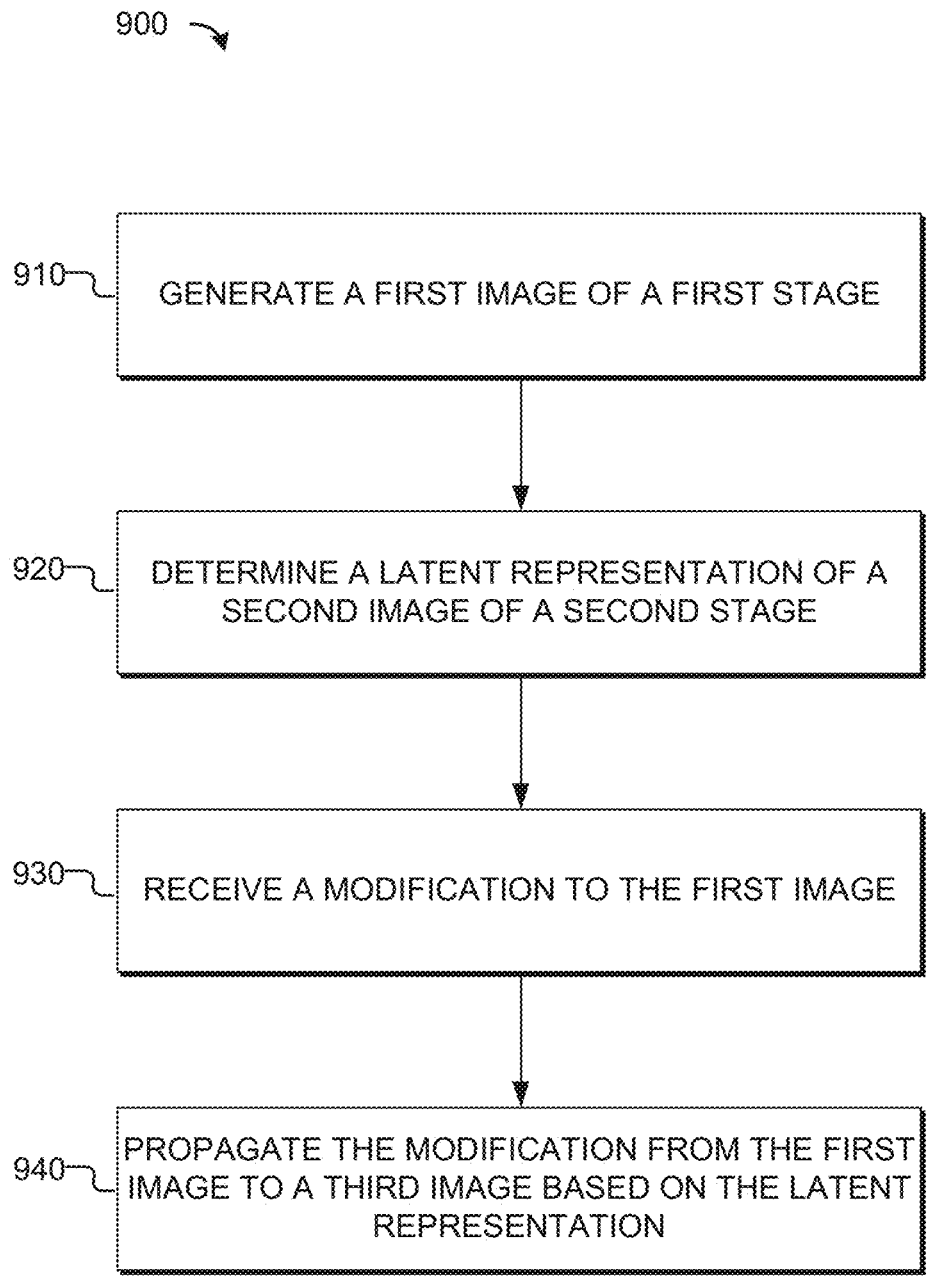
FIG. 9 is a flow diagram illustrating an exemplary process of editing an image, in accordance with at least one aspect of the technologies described herein.

The disclosed technologies can support both multi-stage image generation as well as multi-stage image editing of an existing piece of art. As discussed herein, some embodiments (as illustrated in FIG. 5) are to synthesize novel artwork via multiple creation stages based on an image synthesizing process (as illustrated in FIG. 8), and some embodiments (as illustrated in FIG. 10) are to edit existing artwork at various creation stages based on an image editing process (as illustrated in FIG. 9). Furthermore, the image editing process uses an optimization process (e.g., with the adaptive instance normalization (AdaIN)) along with a learning-based regularization process to ensure that the final output image with the edited features still closely aligns with the original image in appearance and unedited features. In some embodiments, the learning-based regularization is to address the reconstruction problem, especially the overfitting issue associated with the AdaIN optimization, so that the disclosed solution can enable non-destructive artwork editing.

Advantageously, the disclosed technical solution makes the artwork creation and editing fields accessible to novices in a particular type of artwork, based on the disclosed framework that models the creation stages of a creation workflow for the particular type of artwork. Furthermore, by using a multi-stage framework to model stage-specific variations at respective creation stages, the disclosed technical solution also overcomes the limitations of single-stage generation strategy in various conventional systems. Specifically, the multi-stage framework uses a deep-learning-based approach to map the variation in the training data onto stage-specific low-dimensional latent space, e.g., using GAN models. Editing can be conducted by manipulating the latent representation in the stage-specific learned latent space. Variations for synthesizing new images can also be obtained based on the latent representation in the stage-specific learned latent space. As a result, the disclosed technologies enable user-guided stage-specific image processing without degrading the realism of the synthesized images, which represents another significant progress in the field of image processing. Enabled by the disclosed technologies, a novice user can now edit an existing artwork image or synthesize new artwork images based on stage-specific operations on a specific stage of a creation workflow.

Additionally, qualitative and quantitative results from various experiments on three different artistic datasets demonstrate the effectiveness of the disclosed technical solution on both image synthesizing and editing applications, including synthesizing novel artwork images via stage-specific variations introduced in one or more creation stages, and synthesizing an edited image with stage-specific edits introduced in one or more creation stages. Specifically, three datasets with different creation stages were used in these experiments to demonstrate different practical applications in face drawing, anime drawing, and chair design, as illustrated by various figures.

For quantitative evaluations, the reconstruction error and Fréchet inception distance (FID) are measured. The quantitative results validate the effectiveness of the disclosed optimization and the learning-based regularization.

The disclosed technical solution has made creating high-quality artwork more accessible and efficient. Many practical applications based on the disclosed technologies can be developed for image processing with the multi-stage operations artists currently perform to create digital or non-digital art.

Having briefly described an overview of aspects of the technologies described herein, referring now to FIG. 1, exemplary images, generated by an exemplary system, are presented to illustrate creation workflows for respective image types in face drawing, anime drawing, and chair design.

Different practical applications may require different creation workflows, and different image types may also require different creation workflows. In FIG. 1, at least one example illustrates a workflow for multi-stage artwork creation, and at least another example illustrates a workflow for multi-stage artwork editing.

In the multi-stage artwork editing process, the disclosed system can model the sequential creation stages for a given image type by learning from examples of this particular image type during the training phrase. At the inference time, starting from a final piece of artwork, the disclosed system can infer all intermediate images at respective intermediate creation stages. The user is enabled to perform different types of editing on various stages. A modification at an intermediate creation stage may be propagated forward to the final synthesized image.

Block 110 illustrates a creation workflow for face drawing, which contains three creation stages, namely sketch, flat coloring, and detail drawing. Sketch refers to the stage of the preliminary drawing for later elaboration. Flat coloring refers to the stage of adding solid color coverage with no texture, patterns, gradations, or other features. The selected solid color could be bright or dull, light or dark, or any hue, but remains as a featureless field of color. Detail drawing refers to the stage of adding details, such as texture, patterns, gradations, detailed styles, or other features. For example, a color will gain contrast with the surrounding colors at this stage. In this example, the disclosed system transforms input image 112 into three images corresponding to the three creation stages. Specifically, images 114, 116, and 118 are images derived from input image 112 at the respective stages of sketch, flat coloring, and detail drawing.

Enabled by the disclosed technologies, the user may choose to edit any one of the intermediate images at an arbitrary stage. As an example, a user may edit image 114 and change it to image 124. Subsequently, the disclosed systems can propagate the modifications at the stage of sketch to the stage of detail drawing via the stage of flat coloring. In this instance, the modifications are propagated to image 126 and then to image 128. Notably, image 128 still resembles image 118 except for the modifications made at the stage of sketch. As another example, the user may choose to edit image 136 at the stage of flat coloring. In this case, the modifications to image 136 will be propagated to image 138 at the stage of detail drawing. Notably, image 138 also resembles the likeness of image 118 except for the modifications made at the stage of flat coloring.

Block 150 illustrates a creation workflow for chair design. This type of images contains four creation stages, including sketch, normal map, coloring, and lighting. In this example, the disclosed system transforms input image 142 into four images corresponding to the four creation stages. Specifically, images 152, 154, 156, and 158 are derived from input image 142 at the respective stages of sketch, normal map, coloring, and lighting.

Enabled by the disclosed technologies, a user may edit image 152 and change it to image 162. Subsequently, the disclosed systems can propagate the edited features through all intermediate stages, including the final stage of lighting. Notably, image 168 will resemble image 158 except for the edited features received at the stage of sketch. Furthermore, the user may choose to edit at multiple stages. For example, the user may choose to edit image 152 at the stages of sketch and lighting. In this case, both image 172 and image 178 received some modifications. Accordingly, image 178 will retain all modifications received from prior creation stages.

In the multi-stage artwork creation process, starting from a user selected stage, the disclosed system can guide the user through the creation process introducing variations or options at one or more subsequent creation stages. In various embodiments, the disclosed system can model the sequential creation stages for a given image type by learning from examples of this particular image type during the training phrase. At the inference time, the disclosed system can guide the user creating new artwork by sampling different variations at each creation stage.

Block 180 illustrates a creation workflow for anime drawing, which contains three creation stages, namely sketch, rough coloring, and detail drawing. The user may start from image 182, which is at the stage of sketch. The disclosed system may sample the latent representation/ distribution of this type of images at the next stage so that variations may be introduced to synthesize different images at the next stage. In one embodiment, the latent distribution may be sampled by just picking a random N-dimensional number, where N is the dimensionality of the latent space.

In this example, the latent representation at the stage of rough coloring is sampled twice to introduce the variations illustrated in image 184 and image 194. Similarly, the latent representation at the stage of detail drawing is sampled multiple times to introduce the variations illustrated in the image 186 and image 188, which are derived from image 184, as well as in image 196 and image 198, which are derived from image 194.

Additional details regarding the disclosed system will now be provided with reference to FIG. 2, which illustrates a schematic diagram of an example system 210 in accordance with one or more embodiments. An overview of system 210 is described in relation to FIG. 2. Thereafter, a more detailed description of the components and processes of system 210 is provided in relation to the subsequent figures.

In some embodiments, system 210 is configured as an image creation system for creating different types of artwork. By way of example, image 252 may be selected as the starting point for creation of a particular type of art, e.g., a sketch image for face drawing. In one embodiment, system 210 may automatically introduce stage-specific variations at each subsequent creation stage and produce a final face drawing image 262. In another embodiment, system 210 may present stage-specific features that a user may select at a particular creation stage, so that the user may control the variations presented in the final face drawing image 262.

In some embodiments, system 210 is configured as an image editing system for editing different types of artwork. By way of example, image 256, which is an intermediate image derived from an existing image at a particular creation stage, may be selected by a user for editing. System 210 can propagate the modifications to a later stage according to the creation workflow. Image 264 at the later stage would not only resemble the original image but also incorporate the modifications.

System 210 is configured for image processing based on the creation workflow of a type of images. As shown in FIG. 2, in addition to other components not shown here, system 210 may include inference engine 212, generation engine 214, latent encoder 216, and optimizer 218, operatively coupled with each other. Inference engine 212 learns to infer intermediate images from an existing image via multiple stages of inference, while generation engine 214 learns to synthesize a final image from an existing image via multiple stages of generation.

According to an order of the creation workflow, inference engine 212 may include one or more inference networks to infer the previous stage image from the present stage image, while generation engine 204 may include one or more generation networks to generate the next stage image from the present stage image. Latent encoder 216 is configured to encode different types of stage-specific variations presented in a stage-specific latent space. Optimizer 218 is configured to cause a newly synthesized image to fit with the corresponding latent representation without overfitting. Latent encoder 216 may use different variations of NN 240, such as dilated residual network, U-Net, VGG network, variational autoencoder (VAEs), etc. Input to latent encoder 216 can either be a latent encoding (such as the output of another pretrained convolutional network, such as VGG) or a direct encoding (for example, rescale the color channels to the range (−1, 1) and resize the image to a fixed size (e.g., 512×512). More details of latent encoder 216 and optimizer 218 will be further discussed in connection with the subsequent figures.

System 210 may utilize a machine learning model, e.g., implemented via GAN 220, which may include one or more neural networks, e.g., neural network (NN) 240. Specifically, an inference network in inference engine 212 or a generation network in generation engine 214 may be implemented with GAN 220, which models image distribution via adversarial learning schemes.

In various embodiments, GAN 220 includes generator 222 and discriminator 224 to encode the distribution of images 232 into a latent space by learning the mapping from latent representations to generated images 234, e.g., based on loss function 226 in an adversarial learning scheme. Generator 222 and discriminator 224 may utilize one or more neural networks, e.g., NN 240, in their respective operations.

A latent space is the space where the features lie. In general, objects with similar features are closer together compared with objects with dissimilar features in the latent space. For example, when neural networks are used for image processing, images with similar neural features are trained to stay closer in a latent space. Respective latent space may be learned after each layer or selected layers. A latent space is formed in which the neural features lie. The latent space contains a compressed representation of the image, which may be referred to as a latent representation. The latent representation may be understood as a compressed representation of those relevant image features in the pixel space. In various embodiments, an image may be encoded, by a neural network, as its latent representation in a latent space. Another neural network can take this encoded latent representation and recover back the original input image to some extent. In one embodiment, a neural network can bring an image from a high-dimensional space to a bottleneck layer, e.g., where the number of neurons is the smallest. The neural network may be trained to extract the most relevant features in the bottleneck. Accordingly, the bottleneck layer usually corresponds with the lowest dimensional latent space with low-dimensional latent representations.

GAN 220 may include a conditional GAN, which learns to synthesize the output image by referencing the input context such as input images or text descriptions. According to the type of mapping from the input context to the output image, conditional GANs can be categorized as unimodal with a one-to-one mapping or multi-modal with a one-to-many mapping.

In some embodiments, inference engine 212 utilizes unimodal conditional GANs to inference a prior-stage image from the present-stage image, by assuming a unique reserve engineering pathway at the artwork creation workflow. In other embodiments, multi-model conditional GANs may be used, for example, when variations at an earlier stage lead to a homogeneous outcome at an later stage.

In some embodiments, generation engine 214 utilizes multi-modal conditional GANs to synthesize the next-stage images from the present-stage images, by assuming there are many possible variations involved for the generation at each stage of the artwork creation workflow. In other embodiments, unimodel conditional GANs may be used, especially when the user desires a deterministic outcome or has a particular preference in the creation workflow.

NN 240 may include any number of layers. The objective of one type of layers (e.g., Convolutional, Relu, and Pool) is to extract features of the input volume, while the objective of another type of layers (e.g., FC and Softmax) is to classify based on the extracted features. Typically, NN 240 comprises at least three operational layers. The three layers can include an input layer, a hidden layer, and an output layer. Each layer comprises neurons. The input layer neurons pass data to neurons in the hidden layer. Neurons in the hidden layer pass data to neurons in the output layer. The output layer then produces a classification for example. Different types of layers and networks connect neurons in different ways.

Neural networks with more than one hidden layer may be called deep neural networks. Examples of neural networks that may be used with aspects of the technology described herein include, but are not limited to, multilayer perceptron (MLP) networks, convolutional neural networks (CNN), recursive neural networks, recurrent neural networks, and long short-term memory (LSTM) (which is a type of recursive neural network). Some embodiments described herein use a convolutional neural network, but aspects of the technology are applicable to other types of multi-layer machine classification technology.

In various embodiments, system 210 trains GAN 220 and NN 240 with training images 254. As used herein, the term "train" refers to utilizing information to tune or teach a neural network or other machine-learning models. The term "training," when used as a noun, refers to the process of tuning or teaching the machine-learning model. The term "training," when used as an adjective or descriptor, such as "training images" or "training data," refers to information or data utilized to tune or teach the machine-learning model.

In various embodiments, GAN 220 and NN 240 may be trained with labeled images using multiple iterations until the value of a loss function(s) of the machine learning model is below a threshold loss value. The loss function(s) may be used to measure error in the predictions of the machine learning model using ground truth values.

A neuron has an output and weights, an activation function that defines the output of the neuron given an input (including the weights). The weights are the adjustable parameters that cause a network to produce a particular output. The weights are adjusted during training. Once trained, the weight associated with a given neuron can remain fixed. The other data passing between neurons can change in response to a given input (e.g., image).

Training images 254 may comprise different types of images, such as one type of images for face drawing and another type of images for chair design. Training images 254 may be labeled with different labels, such as sketch, flat coloring, and detailed drawing based on the different creation stages for face drawing images. Once trained, system 210 can synthesize a next-stage image or infer a previous-stage image from a given image based on the creation workflow.

As discussed previously, some of the layers may include parameters (e.g., weights and/or biases), such as a convolutional layer, while others may not, such as the ReLU layers and pooling layers, for example. In various embodiments, the parameters may be learned or updated during training. Further, some of the layers may include additional hyper-parameters (e.g., learning rate, stride, epochs, kernel size, number of filters, type of pooling for pooling layers, etc.), such as a convolutional layer or a pooling layer, while other layers may not, such as an ReLU layer. Various activation functions may be used, including but not limited to, ReLU, leaky ReLU, sigmoid, hyperbolic tangent (tan h), exponential linear unit (ELU), etc. The parameters, hyper-parameters, and/or activation functions are not to be limited and may differ depending on the embodiment.

Although input layers, convolutional layers, pooling layers, ReLU layers, and fully connected layers are discussed herein, this is not intended to be limiting. For example, additional or alternative layers, such as normalization layers, softmax layers, and/or other layer types, may be used in NN 240. Further, different orders or different numbers of layers may be used in NN 240 depending on the embodiment.

Although examples are described herein with respect to using neural networks, and specifically convolutional neural networks in FIG. 2, this is not intended to be limiting. For example, and without limitation, system 210 may use any type of machine learning models, such as a machine learning model(s) using linear regression, logistic regression, decision trees, support vector machines (SVM), Naïve Bayes, k-nearest neighbor (KNN), K means clustering, random forest, dimensionality reduction algorithms, gradient boosting algorithms, neural networks (e.g., auto-encoders, convolutional, recurrent, perceptrons, long/short term memory/LSTM, Hopfield, Boltzmann, deep belief, deconvolutional, generative adversarial, liquid state machine, etc.), and/or other types of machine learning models.

System 210 is merely one example of a suitable computing environment and is not intended to suggest any limitation as to the scope of use or functionality of aspects of the technologies described herein. Neither should this system be interpreted as having any dependency or requirement relating to any one component nor any combination of components illustrated. It should be understood that each of the components shown in system 210 may be implemented on any type of computing devices, such as computing device 1000 described in FIG. 10. Different components in system 210 may be distributed to different physical devices. Further, a component may communicate with another component or various external devices via a network, which may include, without limitation, a local area network (LAN) or a wide area network (WAN).

It should be understood that this arrangement in system 210 is set forth only as an example. Other arrangements and elements (e.g., machines, networks, interfaces, functions, orders, and grouping of functions, etc.) can be used in addition to or instead of those shown, and some elements may be omitted altogether for the sake of clarity. Further, many of the elements described herein are functional entities that may be implemented as discrete or distributed components or in conjunction with other components, and in any suitable combinations and locations. Further, various functions described herein as being performed by an entity may be carried out by hardware, firmware, and/or software. For instance, some functions may be carried out by a processor executing special instructions stored in memory, such as creation workflow logic 1022 of FIG. 10.

Referring to FIG. 3, a schematic representation of an exemplary system is shown for implementing at least one aspect of the disclosed technologies. This disclosed system models the sequential creation stages of a creation workflow, so that users can follow the creation stages to generate novel artwork and conduct edits at any one of the creation stages.

In general, the disclosed system comprises inference engine 310 and generation engine 340. Inference engine 310, including one or more inference networks, is trained to sequentially infer the intermediate images at respective creation stages of the creation workflow. Generation engine 340, including one or more generation networks, is trained to synthesize images at respective creation stages of the creation workflow. Latent encoder 360 may encode the variation presented at a creation stage in a stage-specific latent space. Such variation may be used by a generation network in synthesizing an output image from an input image. When editing existing artwork, it is important to alter only the targeted features so that the edited artwork remains as close as possible to the original artwork. To achieve this, optimization engine 380 utilizes an optimization process together with a learning-based regularization in some embodiments, which will be further discussed in connection with FIG. 4.

The disclosed approach is driven by the number of stages in the training dataset and operates in a supervised setting with aligned training data. In general, denoting N as the number of stages, the training dataset is comprised of a set of image groups $\{(x_1, x_2, \ldots, x_N)\}$, where $x_N$ denotes the artwork image at the final stage. The disclosed system constructs N−1 workflow inference network $\{G_i^I\}_{i=1}^N$ as well as N−1 generation network $\{(E_i^G, G_i^G)\}_{i=1}^N$.

Inference engine 310 and generation engine 340 aim to model the sequential creation stages of the creation workflow. In various embodiments, inference engine 310 and generation engine 340 may be constructed with a series of multi-modal conditional GANs. As described below, a creation workflow for face drawing with three stages is used for the purpose of illustration. This particular embodiment utilizes multi-modal (i.e., one-to-many mapping) GANs in generation engine 340 to synthesize images from an earlier stage to a later one, and utilizes uni-modal (i.e., one-to-one mapping) GANs in inference engine 310 to infer images from a later stage to an earlier one. As such, artists can sequentially determine a design factor (i.e., variation) at each stage.

Each generation model contains two components: latent encoder $E_i^G$ and generation network $G_i^G$. The latent encoder $E_i^G$ encodes the variation presented at the $i^{th}$ stage in a stage-specific latent space. Given an input image $x_i$ and the corresponding next-stage image $x_{i+1}$, the latent encoder $E_i^G$ extracts the stage-specific latent representation $z_i$ from the image $x_{i+1}$, and computes the transformation parameter $z_i^{Ada}$.

The generation network $G_i^G$ then takes the current-stage image $x_i$ as input and modulates the activations through the AdaIN normalization layers with the transformation parameter $z_i^{Ada}$ to synthesize the next-stage image $\hat{x}_{i+1}^G$, e.g., based on Eq. (1). In one embodiment, the objective introduced in the BicycleGAN (Zhu et. al., Toward multimodal image-to-image translation. In NIPS, 2017), denoted as $L_i^{bicycle}$, is used for training the generation model.

$$\hat{x}_{i+1}^G = G_i^G(x_i, E_i^G(x_{i+1})) i \in \{1, 2, \ldots, N-1\}. \quad \text{Eq. (1)}$$

Given three creation stages, the disclosed system has two workflow inference networks (network 352 and network 354) and two generation networks (network 356 and network 358) in this embodiment. Here, inference engine 310 infers the intermediate results (i.e., image 314 and image 316) of the input artwork (i.e., image 312 in this embodiment) at all creation stages via network 352 and network 354. Contrastively, generation engine 340 synthesizes network 356 and network 358 and image 344 and image 346 sequentially from input image 342.

In various embodiments, generation engine 340 computes a latent representation z and transformation parameter $z^{Ada}$ for each stage, then synthesizes the next-stage image with a conditional GAN based on the input image and these transformation parameters. In this embodiment, encoder 334 extracts the stage-specific latent representation $z_1$ from image 314, and computes the transformation parameters $z_1^{Ada}$ for the AdaIN normalization layers (c channels) in network 356. Similarly, encoder 332 extracts the stage-specific latent representation $z_2$ from image 314, and computes the transformation parameters $z_2^{Ada}$ for the AdaIN normalization layers in network 356.

One embodiment of the latent encoder $E_i^G$ in generation engine 340 is latent encoder 360. Latent encoder 360 extracts the stage-specific latent representation z from input image 362 and computes the transformation parameters $z^{Ada}$ for the AdaIN normalization layer in the corresponding generation network.

One embodiment of the optimization engine used in inference engine 310 and generation engine 340 is optimization engine 380, which prevents the generation networks from memorizing the variation determined at the previous stages by utilizing a cycle consistency loss for each stage. In this exemplary instance, image 382 is at the stage of detail coloring, and both image 384 and image 386 are at the stage of flat coloring.

Advantageously, optimization engine 380 is configured to enable the generation network at a given stage to encode only new information at the given stage and preserve prior design decisions from earlier stages. By introducing stage-specific variations incrementally in the generation engine, the disclosed system enables users to identify the precise stage to make stage-specific design decisions, which is a novel feature unavailable in conventional systems.

To achieve this improvement, optimization engine 380 imposes a cycle consistency loss to enforce the generation network to encode the variation presented at the current stage only. Specifically, the inference network $G_i^I$ is configured to map the generated next-stage image 382 back to the current stage. The mapped image 384 should be identical to the original image 386 ($x_i$) at the current stage, e.g., based on Eq. (2). The overall training objective for the artwork generation model at the $i^{th}$ stage may be based on Eq. (3), where $\lambda^c$ controls the importance of the cycle consistency.

$$L_i^c = \|G_i^I(G_i^G(x_i, E_i^G(z_i))) - x_i\|_1 z_i \sim \mathcal{N}(0,1). \quad \text{Eq. (2)}$$

$$L_i^G = L_i^{bicycle} + \lambda^c L_i^c, \quad \text{Eq. (3)}$$

Referring back to inference engine 310, to enable a user to edit the input artwork $x_N$ at different creation stages, inference engine 310 is configured to infer the corresponding images at all previous stages. For the $i^{th}$ stage, inference engine 310 may use a unimodal conditional GAN network to generate the image at the $i^{th}$ stage from the image at the $(i+1)^{th}$ stage, e.g., based on Eq. (4).

$$\hat{x}_i^I = G_i^I(x_{i+1}) i \in \{1, 2, \ldots, N-1\}. \quad \text{Eq. (4)}$$

During the training phase, a hinge version of GAN loss (see Brock, et. al., Large scale GAN training for high fidelity natural image synthesis. In ICLR, 2019. 2, 4) may be used to ensure the realism of the generated image $\hat{x}_i^I$. Furthermore, inference engine 310 may impose an $\ell_1$ loss between the synthesized image $\hat{x}_i^I$ and the ground-truth image $x_i$ to stabilize and accelerate the training. The training objective for inference engine 310 at the $i^{th}$ stage is based on Eq. (5) in some embodiments, where $\lambda^1$ controls the importance of the $\ell_1$ loss.

$$L_i^I = L_i^{GAN}(\hat{x}_i^I) + \lambda^1 \|\hat{x}_i^I - x_i\|_1, \quad \text{Eq. (5)}$$

During the inference phrase, given an input image $x_N$, inference engine 310 may sequentially obtain the images at all previous stages $\{\hat{x}_i^I\}_{i=1}^N$.

Subsequently, generation engine 340 may extract the latent representations $\{z_i\}_{i=1}^{N-1}$ from the inferred images $\{\hat{x}_i^I\}_{i=1}^{N}$, and compute the transformation parameters $\{z_i^{Ada}\}_{i=1}^{N-1}$. Combining the first-stage image $x_1^G = x_1^I$ and the transformation parameters $\{z_i^{Ada}\}_{i=1}^{N-1}$, generation engine 340 can consecutively generate the images $\{\hat{x}_i^G\}_{i=1}^{N}$ at the following stages.

A user can choose a specific stage to edit. Edits at the $i^{th}$ stage can be performed by either manipulating the latent representation $z_i$ or directly modifying the image $x_i^G$. For example, the user can choose to augment the representation $z_1$ to adjust the flat coloring. After editing, generation engine 340 can generate the new artwork image at the final stage, which resembles the original image but with the edited features.

Figure 4:
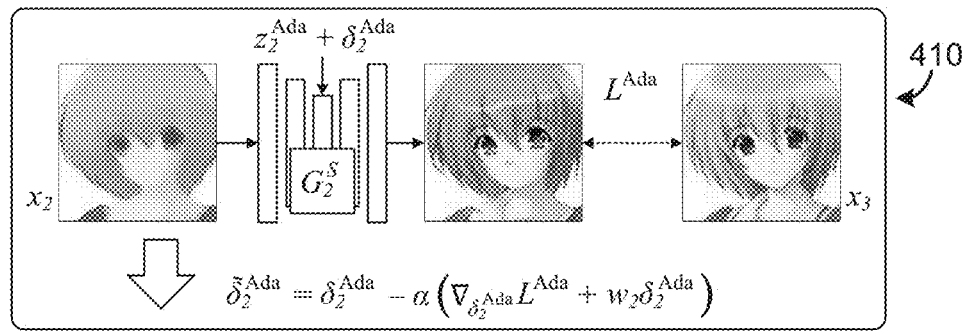
FIG. 4 is a schematic representation illustrating an exemplary optimization process, in accordance with at least one aspect of the technologies described herein.
Figure 4:
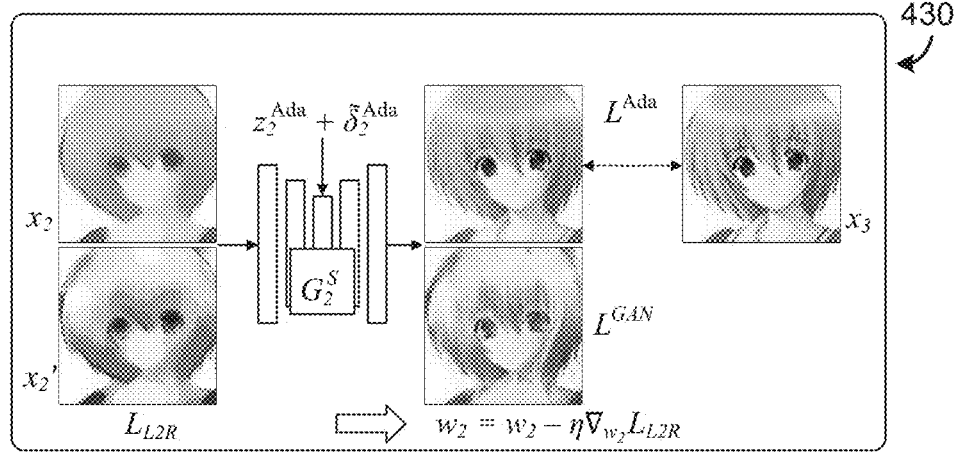
Figure 4:
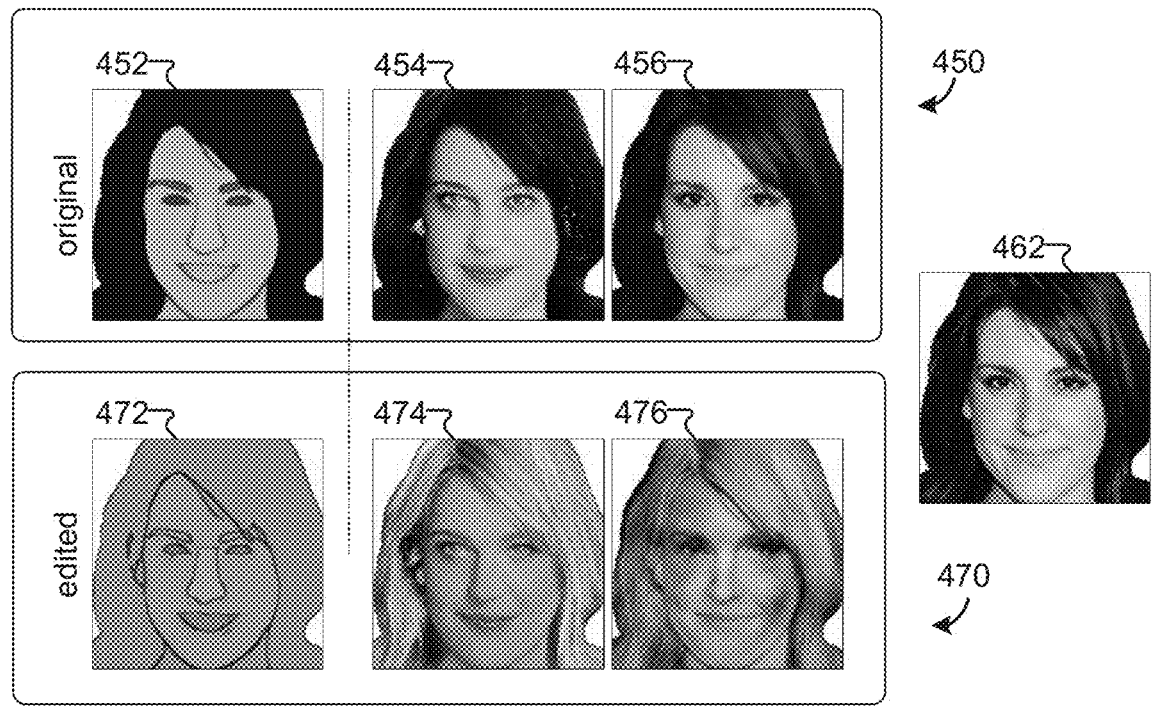

FIG. 4 illustrates an exemplary optimization process with the AdaIN optimization and learning-based regularization. Without the disclosed optimization process, inference engine 310 and generation engine 340 in FIG. 3 may cause the reconstructed image to differ slightly from the initially provided image in some cases. Such reconstruction problems are undesirable since the user expects the generated image to be unchanged when no edits are performed. To address this problem, an optimization procedure along with learning-based regularization is utilized to refine the reconstructed image. This optimization process aims to minimize the difference in appearance between the reconstructed and the original artwork image, while the learning-based regularization seeks to guide the optimization process and alleviate overfitting.

In order to embed an existing image to the latent space learned by a GAN model, an encoder may be trained to learn the mapping from images to latent representations. However, the generator may still fail to reconstruct the original image from the embedded representations, e.g., due to the limited capacity of the low-dimensional latent representation used in synthesizing images in various stages. As a result, a reconstructed image may depart from the ground-truth image.

As discussed previously, the generation module would ideally reconstruct the input artwork image (i.e., $\hat{x}_N^G = x_N$) from the transformation parameters $\{z_i^{Ada}\}_{i=1}^{N-1}$ before the user performs an edit. However, the reconstructed image $\hat{x}_N^G$ may be slightly different from the input image $x_N$.

To address this problem, an optimization-based process, e.g., a gradient descent scheme, may be used to optimize the latent representations and modulations for the feature activations respectively. The goal is to minimize the appearance distance between the generated and original images.

In some embodiments, the disclosed system uses the AdaIN optimization schema to optimize the transformation parameters $\{z_i^{Ada}\}_{i=1}^{N}$ of the AdaIN normalization layers in the artwork generation models. The goal of the AdaIN optimization is to minimize the appearance distance between the reconstructed and input image.

In one experiment, image 462 is the original image or the ground-truth image. In block 450, image 452 is a stage earlier than image 454, which is obtained without the AdaIN optimization, or image 456, which is obtained after applying the AdaIN optimization. Image 456, when compared to image 452, is much closer to the ground-truth image, demonstrating that the AdaIN optimization process makes significant contributions.

Although the AdaIN optimization resolves the reconstruction problem, it may lead to overfitting and results in unrealistic editing results synthesized by the generation model. Block 470 illustrates how the optimization process, without the learning-based regularization, influences the editing. Here, edits were made to image 472. As a result, both image 474, obtained without the AdaIN optimization, and image 476, obtained with the AdaIN optimization, have undesirable artifacts compared to the ground-truth image 462. The optimization process may cause the generation module to memorize input image details, which is one of the reasons for this degraded effect.

To mitigate this memorization issue, the disclosed system uses a learning-based regularization in various embodiments to address the overfitting problem and improve the quality of the edited images. The learning-based regularization is configured to guide the optimization process by preventing the machine learning function from overfitting to a specific solution. However, regularization methods typically involve hyper-parameters that require meticulous hand-tuning to ensure the effectiveness. The disclosed learning-based regularization approach is trained with a particular objective to alleviate the overfitting problem, such that the disclosed learning-based regularization approach can automatically find the hyper-parameters of the weight decay regularization to address the domain generalization problem.

Specifically, the AdaIN optimization aims to minimize the appearance distance between the reconstructed image $\hat{x}_N^G$ and the input artwork image $x_N$. To improve reconstruction, some embodiments optimize the parameters in the generation models, while other embodiments optimize the extracted representations $\{z_i\}_{i=1}^{N}$.

Optimizing model parameters could be inefficient because a large number of parameters need update. On the other hand, optimizing the extracted representation could also be ineffective. Therefore, in some embodiments, the disclosed system chooses to optimize the transformation parameters $\{z_i^{Ada}\}_{i=1}^{N}$ of the AdaIN normalization layers in the generation models, namely the AdaIN optimization.

The AdaIN optimization may be performed for each creation stage sequentially. The transformation parameter at the early stage is optimized and then fixed for the optimization at the later stages. Except for the last stage (i.e., I=N−1) that uses the input artwork image $x_N$, the inferred image $x_{i+1}^I$ by the inference model serves as the reference image $x^{ref}$ or the optimization. At each stage, the latent encoder $E_i^G$ may compute the transformation parameter $z_i^{Ada}$ from the reference image for generating the image.

In one experiment, since there are four AdaIN normalization layers with c channels in each artwork generation model, the dimension of the transformation parameter is 1×8c (a scale and a bias term for each channel). Then the standard gradient descent procedure is used to optimize the transformation parameters with the goal of minimizing the loss function $L^{Ada}$, which measures the appearance distance between the synthesized image $\hat{x}_i^G$ by the generator $G_i^G$ and the reference image $x^{ref}$. The loss function $L^{Ada}$ is a combination of the pixel-wise $\ell_1$ loss and VGG-16 perceptual loss, e.g., based on Eq. 6, where $\lambda_p$ is the importance term.

$$L^{Ada}(\hat{x}_i^G, x^{ref}) = \|\hat{x}_i^G - x^{ref}\|_1 + \lambda_p L^p(\hat{x}_i^G, x^{ref}) \qquad \text{Eq. (6)}$$

The AdaIN optimization process is further illustrated in Algorithm 1 below. In some embodiments, the disclosed system optimizes the incremental term $\delta_i^{Ada}$ for the transformation parameter $z_i^{Ada}$, instead of updating the parameter itself ---
Algorithm 1: AdaIN optimization at $i^{th}$ stage
---
1  Require: reference image $x^{ref} = x_N$ or $x^{ref} = \hat{x}_{i+1}^I$, input image
   $\hat{x}_i^G$, learning rate $\alpha$, iterations T, regularization parameter $w_i$
2  $z_i^{Ada} = E_i^G(x^{ref})$, $\delta_i^{Ada} = 0 \in R^{1 \times 8c}$
3  while $t = \{1, \ldots, T\}$ do
4  $\quad \hat{x}_{i+1}^G = G_i^G(\hat{x}_i^G, z_i^{Ada} + \delta_i^{Ada})$
5  $\quad L^{Ada} = \|\hat{x}_{i+1}^G - x^{ref}\|_1 + \lambda^{PLP}(\hat{x}_i^G, x^{ref})$
6  $\quad \delta_i^{Ada} = \delta_i^{Ada} - \alpha \, (\nabla_{\delta_i^{Ada}} L_{Ada} + w_i \delta_i^{Ada})$
7  end
8  Return: $z_i^{Ada} + \delta_i^{Ada}$
---

As previously discussed, although the AdaIN optimization scheme addresses the reconstruction problem, it could degrade the quality of editing operations, as shown in block 470. This is because the AdaIN optimization causes overfitting (memorization of the reference image $x^{ref}$). To achieve better reconstruction, the incremental term $\delta_i^{Ada}$ for the transformation parameter $z_i^{Ada}$ is updated to extreme values, so the generator becomes sensitive to the change (i.e., editing) on the input image and produces unrealistic results.

To address the overfitting problem, the disclosed system may use weight decay regularization to constrain the magnitude of the incremental term $\delta_i^{Ada}$ as shown in Line 6 in Algorithm 1. However, it is difficult to find a general hyper-parameter setting $w_i \in R^{1 \times 8c}$ for different generation stages of various creation workflows. Accordingly, a learning process is used to optimize the hyper-parameter $w_i$. By updating the incremental term $\delta_i^{Ada}$ with the regularization $w_i \delta_i^{Ada}$, the disclosed system can improve the reconstruction and maintain the realism of edits on an input image.

Block 410 and block 430 illustrate this training process for learning-based regularization to optimize the hyper-parameter $w_i$. Specifically, for the i-th stage (i=2 in this example), the disclosed system optimizes the hyper-parameter $w_i$ for the weight decay regularization ($w_i \delta_i^{Ada}$) by involving the AdaIN optimization in the training process. After the incremental term $\delta_i^{Ada}$ is updated via one step of AdaIN optimization and the weight decay regularization, the training process moves from block 410 to block 430. In block 430, the generation model achieves improved, reconstruction as well as maintains the quality of the editing result. Here, the losses $L^{Ada}$, $L^{GAN}$ computed from the updated parameter $\tilde{\delta}_i^{Ada}$ are used to optimize the hyper-parameter $w_i$.

In each iteration of training at the $i^{th}$ stage, an image pair ($x_i$, $x_{i+1}$) and an additional input image $x'_i$ may be sampled from the training dataset. The image $x'_i$ serves as the edited image of $x_i$. The latent encoder $E_i^G$ may be used to extract the transformation parameter $z_i^{Ada}$ from the next-stage image $x_{i+1}$. As shown in block 410, the disclosed system may then update the incremental term from $\delta_i^{Ada}$ to $\tilde{\delta}_i^{Ada}$ via one step of the AdaIN optimization and the weight decay regularization. With the updated incremental term $\tilde{\delta}_i^{Ada}$ the loss function $L^{Ada}$ may be used to measure the reconstruction quality, and the GAN loss may be used to evaluate the realism of editing results, e.g., based on Eq. (7).

$$L^{L2R} = L^{Ada}(G_i^G(x_i, z_i^{Ada} + \tilde{\delta}_i^{Ada}), x_{i+1}) + \lambda^{GAN} L^{GAN}(G_i^G(x'_i, z_i^{Ada} + \tilde{\delta}_i^{Ada})). \quad \text{Eq. (7)}$$

Finally, since the loss $L^{L2R}$ indicates the efficacy of the weight decay regularization, the disclosed system may optimize the hyper-parameter $x_i$ by Eq. (8), where $\eta$ is the learning rate of the training algorithm for the proposed learning-based regularization.

$$w_i = w_i - \eta \nabla_{w_i} L^{L2R}, \quad \text{Eq. (8)}$$

The following metrics may be used in the quantitative evaluation. Reconstruction error: given the input artwork $x_N$ and the reconstructed image $\hat{x}_N^G$, the $\ell_1$ distance $\|\hat{x}_N^G - x_N\|$ is used to evaluate the reconstruction quality. Further, the Fréchet Inception Distance (FID) score is used to measure the realism of generated images $\hat{x}_N^G$. A smaller FID score indicates better visual quality.

For quantitative evaluation, the AdaIN optimization is conducted for each stage sequentially to reconstruct the testing image at the final stage. Both the reconstruction error and FID score are used to evaluate several baseline methods and the AdaIN optimization. The results are shown in Table 1. The $\ell_1$ pixel-wise distance ($\downarrow$) and the FID ($\downarrow$) score are used to evaluate the reconstruction ability. w and LR indicate the hyper-parameter for the weight regularization and applying the learned regularization, respectively.

TABLE 1

Quantitative results of reconstruction.

| Optimization | w | Face $\ell_1$ | Face FID | Anime $\ell_1$ | Anime FID | Chair $\ell_1$ | Chair FID |
|---|---|---|---|---|---|---|---|
| None | — | 0.094 | 39.78 | 0.127 | 36.73 | 0.074 | 129.2 |
| z | 0 | 0.104 | 40.70 | 0.126 | 45.66 | 0.068 | 107.0 |
| AdaIN | 0 | 0.040 | 34.61 | 0.042 | 26.56 | 0.009 | 46.48 |
| AdaIN | $10^{-3}$ | 0.043 | 35.78 | 0.056 | 29.14 | 0.019 | 53.08 |
| AdaIN | $10^{-2}$ | 0.053 | 39.19 | 0.097 | 43.31 | 0.049 | 83.58 |
| ADAIN | LR | 0.045 | 33.28 | 0.070 | 34.16 | 0.018 | 49.44 |

Results in the 2nd and 3rd rows in Table 1 demonstrate that the AdaIN optimization is more effective than optimizing the latent representations. On the other hand, applying stronger weight decay regularization diminishes the reconstruction ability of the AdaIN optimization. By applying the weight decay regularization with learned hyper-parameter w (i.e., LR), the disclosed system achieves comparable reconstruction performance in comparison to the optimization without regularization.

For image editing, the way in which various optimization methods influence the quality of edited images is investigated in an experiment. For each testing final-stage image, different optimization approaches to refine the reconstructed images are first used. The editing is then conducted by re-sampling the latent representation $z_i$ at a randomly chosen stage. The FID score is adopted to measure the quality of the edited images and show the results in Table 3 in connection with FIG. 7. As described earlier, applying the AdaIN optimization causes overfitting that degrades the quality of the edited images. For instance, applying the AdaIN optimization increases the FID score from 38.68 to 44.28 on the face drawing dataset. One straightforward solution for alleviating this issue is to apply strong weight decay regularizations (i.e., $w = 10^{-2}$). However, according to the results in the 5th row of Table 1, such strong regularizations reduce the reconstruction effectiveness of the AdaIN optimization. The experimental results in Table 1 and Table 3 demonstrate that applying the regularization with the learned hyper-parameter w not only mitigates overfitting but also maintains the efficacy of the AdaIN optimization.

Now referring to FIG. 5, exemplary images are presented to illustrate an exemplary image creation process. In general, the disclosed system takes sketches as the input and synthesizes images in the subsequent creation stages, by randomly sampling the latent representations at respective stages.

In this experiment, images from the face drawing, anime drawing, and chair design datasets are used. Table 2 summarizes the three datasets, the number of training images, the number of testing images, etc.

TABLE 2

Summarization of the datasets.

| Dataset | Face drawing | Anime drawing | Chair design |
|---|---|---|---|
| # Training Images | 29000 | 33323 | 12546 |
| # Testing Images | 1000 | 1000 | 1000 |
| Stages | 1. sketch<br>2. flat coloring<br>3. detail drawing | 1. sketch<br>2. rough coloring<br>3. detail drawing | 1. sketch<br>2. normal map<br>3. coloring<br>4. lighting |

This experiment uses sketches as inputs, and randomly samples various latent representation $z \in \{z_i\}_{i=1}^{N-1}$ at each stage of the creation workflow. The generation module sequentially synthesizes the final images via multiple stages.

For anime drawing 510, from sketch 512, image 514, image 516, and image 518 are generated at the stage of rough coloring. Next, image 522, image 524, and image 526 are generated at the stage of detail drawing.

For chair design 530, from sketch 532, various intermediate images are generated at the stage of normal map. Next, from image 534, various intermediate images are generated at the stage of coloring. Finally, from image 536, various final images are generated at the stage of lighting, including image 542, image 544, and image 546.

For face drawing 550, from sketch 552, various intermediate images are generated at the stage of flat coloring. Next, from image 554, various final images are generated at the stage of detail drawing, including image 562, image 564, and image 566.

In summary, the disclosed system can generate variations by sampling different random latent codes at different stages. For example, when generating anime drawings, manipulating the latent code at the final stage produces detailed color variations, such as modifying the saturation or adding highlights to the hair regions.

Figure 6:
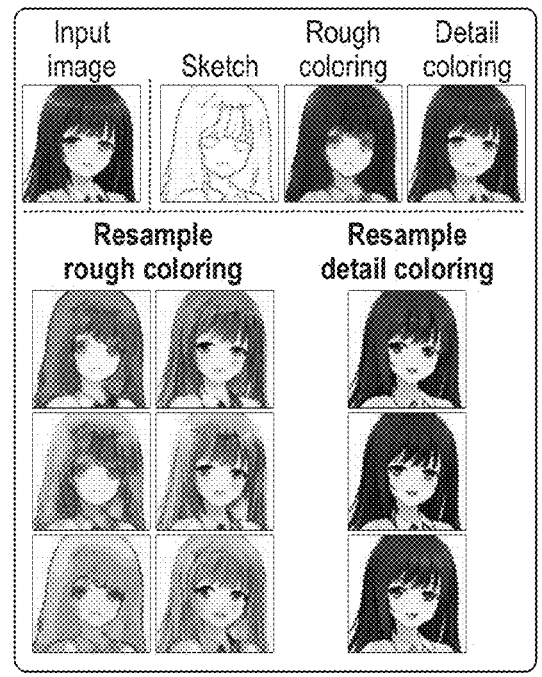
FIG. 6 depicts exemplary images, generated by an exemplary system, illustrating an exemplary image editing process based on a resampling technique, in accordance with at least one aspect of the technologies described herein.
Figure 6:
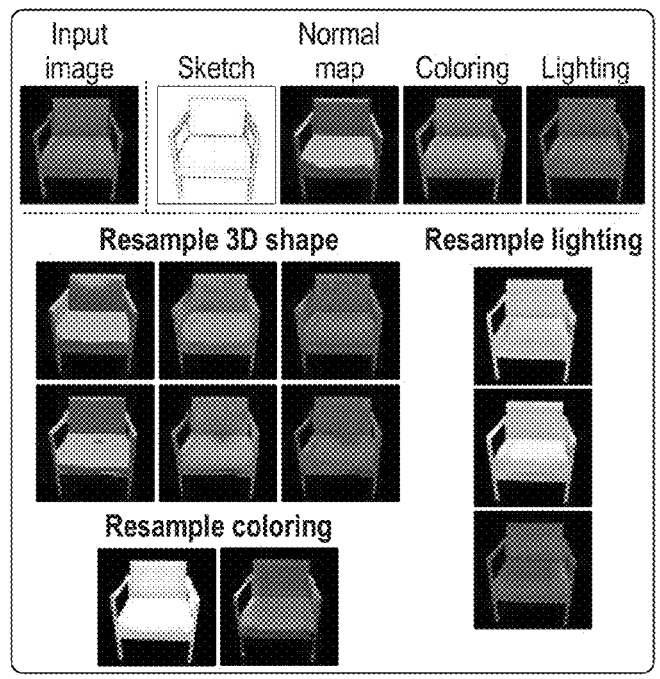

Now referring to FIG. 6, exemplary images are presented to illustrate an exemplary image editing process based on a resampling technique. In general, after the AdaIN optimization process to reconstruct the input image, the reconstructed image is edited by re-sampling the latent representations at various stages. Block 610 shows the results of re-sampling rough coloring and detail coloring for the anime drawing dataset. Block 630 shows the results of re-sampling 3D shape, coloring, and lighting respectively with the chair design dataset.

Specifically, in this experiment, after the AdaIN optimization reconstructs the testing image at the final stage (first row in block 610 or block 630), the representations $z \in \{z_i\}_{i=1}^{N-1}$ at various stages are re-sampled. The re-sampling technique, as an editing technique, guides the generation module to generate different images.

Advantageously, the disclosed system is capable of synthesizing the final artwork such that its appearance only changes with respect to the stage with re-sampled latent code. For example, when editing face drawings, re-sampling representations at the flat coloring stage only affects hair color, while maintaining the haircut style and details.

This experiment also demonstrates that a user may manipulate a latent representation to modify an image. By manipulating a specific latent representation, the user may change the size or shape of different parts of a sketch (e.g., larger nose or bigger smile), change the flat color of different parts of an image (e.g., change grass from brown to dark green), alter the lighting of the rendering of a 3D model (e.g., change from an interior room with two lights to an outdoor lighting environment at sunset, or vice-versa), delete an object (e.g., remove a background individual from a photograph to highlight the main character in a portrait), or other aspects of the design.

Figure 7:
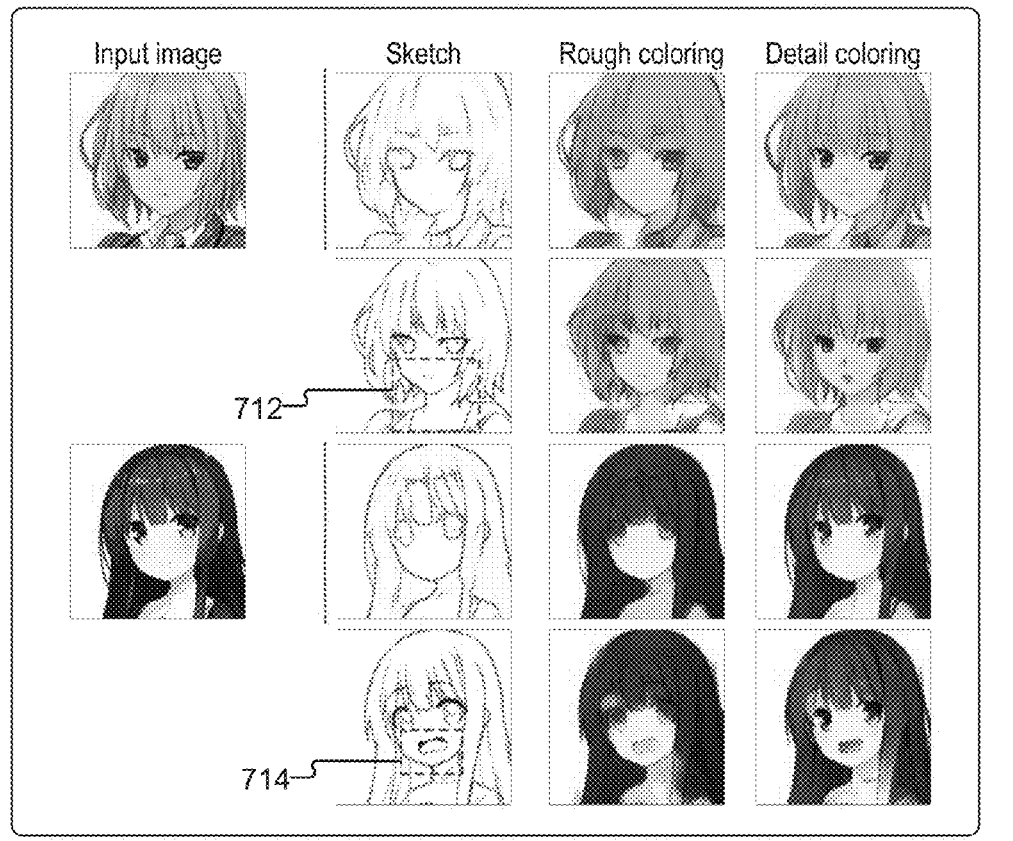
FIG. 7 depicts exemplary images, generated by an exemplary system, illustrating an exemplary image editing process, in accordance with at least one aspect of the technologies described herein.
Figure 7:
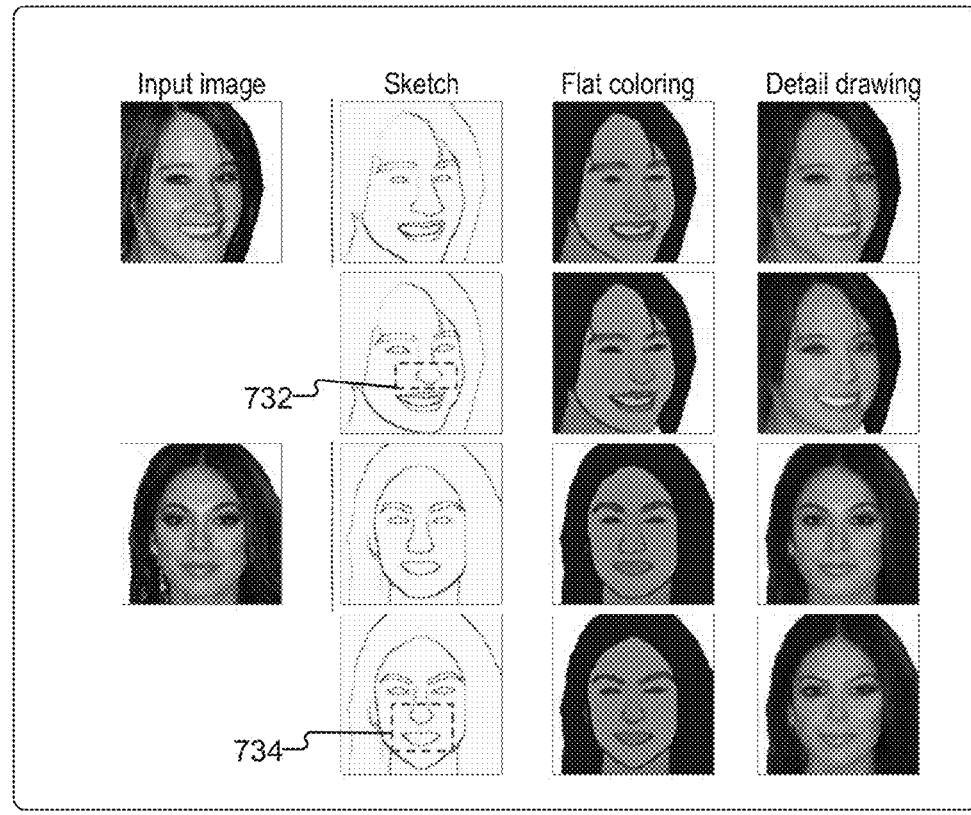

Now referring to FIG. 7, exemplary images are presented to illustrate an exemplary image editing process based on manual editing. To evaluate the interactivity of the disclosed system, professional artists tried to edit some example sketches. First, the inference engine is used to infer the initial sketch from the input artwork image, as shown in the sketch column in block 710 or block 730. Given the artwork image and the corresponding sketch, an artist modified the sketch manually. For example, region 712 and region 714 have been modified in block 710. Similarly, region 732 and region 734 have been modified in block 730. Next, the generation engine uses an edited sketch to generate images in the subsequent stages till the final edited image is produced.

This experiment confirms that the disclosed system can enable an artists to adjust only a specific feature in a specific stage of the creation workflow, so that the artist can precisely control a particular aspect of the final synthesized image. Table 3 presents the quantitative results of editing in this experiment, where the FID ($\downarrow$) score is used to evaluate the quality of the edited images $\hat{x}_N^G$, and w and LR indicate the hyper-parameter for the weight regularization and applying the learned regularization, respectively.

TABLE 3

Quantitative results of editing.

| Optimization | w | Face | Anime | Chair |
|---|---|---|---|---|
| None | — | 38.68 ± 0.44 | 35.59 ± 0.12 | 128.4 ± 1.50 |
| AdaIN | 0 | 44.28 ± 0.45 | 37.40 ± 0.36 | 97.90 ± 1.20 |
| AdaIN | $10^{-3}$ | 41.75 ± 0.49 | 38.95 ± 0.59 | 91.68 ± 4.23 |
| AdaIN | $10^{-2}$ | 38.57 ± 0.94 | 38.07 ± 0.54 | 99.36 ± 7.23 |
| AdaIN | LR | 39.40 ± 0.21 | 35.73 ± 0.26 | 95.25 ± 0.73 |

Referring now to FIG. 8, a flow diagram is provided that illustrates an exemplary process 800 of modeling creation workflows, e.g., performed by system 210 of FIG. 2.

At block 810, the process receives a first image of a first stage of a plurality of sequential creation stages for creating a type of images. In some embodiments, the first stage is the stage of sketch for the type of images. In some embodiments, the first stage may be any one of the intermediate stages.

At block 820, the process selects a variation from a stage-specific latent representation of the type of images at a second stage of the plurality of sequential creation stages. In various embodiments, the respective stage-specific latent representations of the type of images are different in different stages. Further, the process may compute, based on the variation from the stage-specific latent representation, a transformation parameter for an adaptive instance normalization layer of a generation network.

At block 830, the process synthesizes, based on the first image and the variation from the stage-specific latent representation, a second image of the second stage of the plurality of sequential creation stages. In various embodiments, the process modulates feature activations of the generation network through the adaptive instance normalization layer with the transformation parameter to synthesize the second image of the second stage. In various embodiments, the process is further to mitigate a memorization of the stage-specific latent representation of the type of images at the second stage by applying a weight decay regularization model with a learned hyper-parameter. In various embodiments, the process is further to select another variation from the another stage-specific latent representation of the type of images; and synthesize, based on the second image and the another variation from the another stage-specific latent representation, a third image of a third stage of the plurality of sequential creation stages.

Referring now to FIG. 9, a flow diagram is provided that illustrates an exemplary process 900 of modeling creation workflows, e.g., performed by system 210 of FIG. 2.

At block 910, the process generates a first image of a first stage via one or more inference networks. In some embodiments, the first image is one of a plurality of intermediate images at respective creation stages of the plurality of sequential creation stages for creating a type of images. In some embodiments, the one or more inference networks include a plurality of unimodal conditional generative adversarial networks, and the process further sequentially infers the plurality of intermediate images using the plurality of unimodal conditional generative adversarial networks.

At block 920, the process determines a latent representation of a second image of a second stage among the plurality of sequential creation stages. In some embodiments, an encoder may be used to extract the stage-specific latent representation from the second image, and compute the transformation parameters for the AdaIN normalization layers in a corresponding generation network.

At block 930, the process receives a modification to the first image. In some embodiments, the modification is produced by a manipulation of the latent representation. In some embodiments, the modification is produced by manual edits from a user.

At block 940, the process propagates the modification from the first image to a third image based on the latent representation. In some embodiments, the process propagates, based on the latent representation of the second image, the modification from the first image to a third image of the second stage via one or more generation networks. In some embodiments, the third image corresponds to the last stage of the plurality of sequential creation stages. In some embodiments, the process generates the third image with the modification based on a plurality of multi-modal conditional generative adversarial networks in the one or more generation networks. In some embodiments, the process encodes stage-specific features into respective separate latent spaces at respective stages of the plurality of sequential creation stages. In some embodiments, the process enables, based on a cycle consistency loss, the one or more generation networks to encode stage-specific features at a current stage and preserve features from earlier stages according to an order of the plurality of sequential creation stages.

Accordingly, we have described various aspects of the disclosed technologies for image processing based on a creation workflow. Each block in process 800, process 900, and other processes described herein comprises a computing process that may be performed using any combination of hardware, firmware, or software. For instance, various functions may be carried out by a processor executing instructions stored in memory. The processes may also be embodied as computer-usable instructions stored on computer storage media or devices. The process may be provided by an application, a service, or a combination thereof.

It is understood that various features, sub-combinations, and modifications of the embodiments described herein are of utility and may be employed in other embodiments without reference to other features or sub-combinations. Moreover, the order and sequences of steps/blocks shown in the above example processes are not meant to limit the scope of the present disclosure in any way, and in fact, the steps/blocks may occur in a variety of different sequences within embodiments hereof. Such variations and combinations thereof are also contemplated to be within the scope of embodiments of this disclosure.

Referring to FIG. 10, an exemplary operating environment for implementing various aspects of the technologies described herein is shown and designated generally as computing device 1000. Computing device 1000 is but one example of a suitable computing environment and is not intended to suggest any limitation as to the scope of use of the technologies described herein. Neither should the computing device 1000 be interpreted as having any dependency or requirement relating to any one or combination of components illustrated.

The technologies described herein may be described in the general context of computer code or machine-useable instructions, including computer-executable instructions such as program components, being executed by a computer or other machine. Generally, program components, including routines, programs, objects, components, data structures, and the like, refer to code that performs particular tasks or implements particular abstract data types. The technologies described herein may be practiced in a variety of system configurations, including handheld devices, consumer electronics, general-purpose computers, and specialty computing devices, etc. Aspects of the technologies described herein may also be practiced in distributed computing environments where tasks are performed by remote-processing devices that are connected through a communications network.

With continued reference to FIG. 10, computing device 1000 includes a bus 1010 that directly or indirectly couples the following devices: memory 1020, processors 1030, presentation components 1040, input/output (I/O) ports 1050, I/O components 1060, and an illustrative power supply 1070. Bus 1010 may include an address bus, data bus, or a combination thereof. Although the various blocks of FIG. 10 are shown with lines for the sake of clarity, delineating various components is not so clear in various embodiments, and metaphorically, the lines would more accurately be grey and fuzzy. For example, one may consider a presentation component such as a display device to be an I/O component. The inventors hereof recognize that such is the nature of the art and reiterate that the diagram of FIG. 10 is merely illustrative of an exemplary computing device that can be used in connection with different aspects of the technologies described herein. Distinction is not made between such categories as "workstation," "server," "laptop," "handheld device," etc., as all are contemplated within the scope of FIG. 10 and refers to "computer" or "computing device."

Computing device 1000 typically includes a variety of computer-readable media. Computer-readable media can be any available media that can be accessed by computing device 1000 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technologies for storage of information such as computer-readable instructions, data structures, program modules, or other data.

Computer storage media includes RAM, ROM, EEPROM, flash memory or other memory technologies, CD-ROM, digital versatile disks (DVD) or other optical disk storage, magnetic cassettes, magnetic tape, magnetic disk storage or other magnetic storage devices. Computer storage media does not comprise a propagated data signal. A computer-readable device or a non-transitory medium in a claim herein excludes transitory signals.

Communication media typically embodies computer-readable instructions, data structures, program modules, or other data in a modulated data signal such as a carrier wave or other transport mechanism and includes any information delivery media. The term "modulated data signal" means a signal that has its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer-readable media.

Memory 1020 includes computer storage media in the form of volatile and/or nonvolatile memory. The memory 1020 may be removable, non-removable, or a combination thereof. Exemplary memory includes solid-state memory, hard drives, optical-disc drives, etc. Computing device 1000 includes processors 1030 that read data from various entities such as bus 1010, memory 1020, or I/O components 1060. Presentation component(s) 1040 present data indications to a user or another device. Exemplary presentation components 1040 include a display device, speaker, printing component, vibrating component, etc. I/O ports 1050 allow computing device 1000 to be logically coupled to other devices, including I/O components 1060, some of which may be built in.

In various embodiments, memory 1020 includes, in particular, temporal and persistent copies of creation workflow logic 1022. Creation workflow logic 1022 includes instructions that, when executed by processor 1030, result in computing device 1000 performing functions, such as, but not limited to, process 800, process 900, or their sub-processes. In various embodiments, creation workflow logic 1022 includes instructions that, when executed by processors 1030, result in computing device 1000 performing various functions associated with, but not limited to various components in connection with system 210 in FIG. 2 and various networks in FIGS. 2-3.

In some embodiments, processors 1030 may be packed together with creation workflow logic 1022. In some embodiments, processors 1030 may be packaged together with creation workflow logic 1022 to form a System in Package (SiP). In some embodiments, processors 1030 can be integrated on the same die with creation workflow logic 1022. In some embodiments, processors 1030 can be integrated on the same die with creation workflow logic 1022 to form a System on Chip (SoC).

Illustrative I/O components include a microphone, joystick, game pad, satellite dish, scanner, printer, display device, wireless device, a controller (such as a stylus, a keyboard, and a mouse), a natural user interface (NUI), and the like. In aspects, a pen digitizer (not shown) and accompanying input instrument (also not shown but which may include, by way of example only, a pen or a stylus) are provided in order to digitally capture freehand user input. The connection between the pen digitizer and processor(s) 1030 may be direct or via a coupling utilizing a serial port, parallel port, and/or other interface and/or system bus known in the art. Furthermore, the digitizer input component may be a component separate from an output component such as a display device. In some aspects, the usable input area of a digitizer may coexist with the display area of a display device, be integrated with the display device, or may exist as a separate device overlaying or otherwise appended to a display device. Any and all such variations, and any combination thereof, are contemplated to be within the scope of aspects of the technologies described herein.

I/O components 1060 include various GUIs, which allow users to interact with computing device 1000 through graphical elements or visual indicators, such as various graphical elements illustrated in FIGS. 1-2. Interactions with a GUI are usually performed through direct manipulation of graphical elements in the GUI. Generally, such user interactions may invoke the business logic associated with respective graphical elements in the GUI. Two similar graphical elements may be associated with different functions, while two different graphical elements may be associated with similar functions. Further, a same GUI may have different presentations on different computing devices, such as based on the different graphical processing units (GPUs) or the various characteristics of the display.

Computing device 1000 may include networking interface 1080. The networking interface 1080 includes a network interface controller (NIC) that transmits and receives data. The networking interface 1080 may use wired technologies (e.g., coaxial cable, twisted pair, optical fiber, etc.) or wireless technologies (e.g., terrestrial microwave, communications satellites, cellular, radio and spread spectrum technologies, etc.). Particularly, the networking interface 1080 may include a wireless terminal adapted to receive communications and media over various wireless networks. Computing device 1000 may communicate with other devices via the networking interface 1080 using radio communication technologies. The radio communications may be a short-range connection, a long-range connection, or a combination of both a short-range and a long-range wireless telecommunications connection. A short-range connection may include a Wi-Fi® connection to a device (e.g., mobile hotspot) that provides access to a wireless communications network, such as a wireless local area network (WLAN) connection using the 802.11 protocol. A Bluetooth connection to another computing device is a second example of a short-range connection. A long-range connection may include a connection using various wireless networks, including 1G, 2G, 3G, 4G, 5G, etc., or based on various standards or protocols, including General Packet Radio Service (GPRS), Enhanced Data rates for GSM Evolution (EDGE), Global System for Mobiles (GSM), Code Division Multiple Access (CDMA), Time Division Multiple Access (TDMA), Long-Term Evolution (LTE), 802.16 standards, etc.

The technologies described herein have been described in relation to particular aspects, which are intended in all respects to be illustrative rather than restrictive. While the technologies described herein are susceptible to various modifications and alternative constructions, certain illustrated aspects thereof are shown in the drawings and have been described above in detail. It should be understood, however, that there is no intention to limit the technologies described herein to the specific forms disclosed, but on the contrary, the intention is to cover all modifications, alternative constructions, and equivalents falling within the spirit and scope of the technologies described herein.

What is claimed is:

1. A computer system for image processing, comprising:
an inference network configured to backward transform, based on an order of a plurality of creation stages for an image type, a first image of the image type to a second image, wherein a corresponding stage of the first image is later than a corresponding stage of the second image among the order of the plurality of creation stages; and
a generation network, operatively coupled to the inference network, configured to forward transform, based on the order of the plurality of creation stages for the image type, a third image to a fourth image, wherein a corresponding stage of the fourth image is later than a corresponding stage of the third image among the order of the plurality of creation stages.

2. The computer system of claim 1, further comprising:
an encoder, operatively coupled to the generation network, configured to determine, based on the first image, one or more stage-specific transformation parameters for the generation network to transform the third image to the fourth image.

3. The computer system of claim 2, wherein the generation network is further configured to apply the one or more stage-specific transformation parameters to an adaptive instance normalization layer of the generation network.

4. The computer system of claim 1, wherein the generation network is further configured to reduce an appearance distance between the first image and the fourth image with a learning-based regularization function.

5. The computer system of claim 1, wherein the computer system is further configured to apply a cycle consistency loss between the inference network and the generation network to reduce a residual memory of transformation parameters determined at a prior generation network.

6. The computer system of claim 1, further comprising:
a plurality of inference networks, connected in a first serial links, configured to transform, based on the order of the plurality of creation stages, an image to a plurality of intermediate images, wherein the inference network is one of the plurality of inference networks.

7. The computer system of claim 1, further comprising:
a plurality of generation networks, connected in a second serial links, configured to transform, based on the order of the plurality of creation stages, a first-stage image to a last-stage image, wherein the generation network is one of the plurality of generation networks.

8. The computer system of claim 7, wherein the plurality of generation networks is further configured to enable an artist to control an aspect of the fourth image by adjusting an intermediate image at a specific stage of the plurality of creation stages.

9. The computer system of claim 1, further comprising:
a first count of inference networks, wherein the inference network is one of the first count of inference networks;
a first count of generation networks, wherein the generation network is one of the first count of inference networks; and
a first count of encoders, each operatively coupled to a corresponding generation network, configured to determine, based on an input image to a corresponding inference network, a stage-specific transformation parameter for the corresponding generation network to transform an input image of the corresponding generation network to an output image of the corresponding generation network,
wherein the input image of the corresponding inference network and the output image of the corresponding generation network belong to a same stage in the plurality of creation stages,
wherein a second count of the plurality of creation stages is greater than the first count of encoders.

10. A computer-implemented method for image processing, comprising:
generating, via one or more inference networks, a first image of a first stage among a plurality of sequential creation stages for creating a type of images;
determining a latent representation of a second image of a second stage among the plurality of sequential creation stages;
receiving a modification to the first image; and
propagating, based on the latent representation of the second image, the modification from the first image to a third image of the second stage via one or more generation networks.

11. The method of claim 10, wherein the first image is one of a plurality of intermediate images at respective creation stages of the plurality of sequential creation stages, the one or more inference networks comprises a plurality of unimodal conditional generative adversarial networks, the method further comprising:
sequentially inferring the plurality of intermediate images with the plurality of unimodal conditional generative adversarial networks.

12. The method of claim 10, wherein the third image corresponds to a last stage of the plurality of sequential creation stages, and wherein the propagating comprises generating the third image with the modification based on a plurality of multi-modal conditional generative adversarial networks in the one or more generation networks.

13. The method of claim 10, wherein the propagating comprises encoding stage-specific features into respective separate latent spaces at respective stages of the plurality of sequential creation stages.

14. The method of claim 10, wherein the modification comprises a manipulation of the latent representation.

15. The method of claim 10, further comprising:
enabling, based on a cycle consistency loss, the one or more generation networks to encode stage-specific features at a current stage and to preserve features from earlier stages according to an order of the plurality of sequential creation stages.

16. A computer-readable storage device encoded with instructions that, when executed, cause one or more processors of a computing system to perform operations of image processing, comprising:
generating, via a backwards transform, a first image of a first stage among a plurality of sequential creation stages for creating a type of images;
selecting a variation of the first image from a stage-specific latent representation of a second image at a second stage of the plurality of sequential creation stages, wherein the stage-specific latent representation of the second image at the second stage is different from another stage-specific latent representation of the type of images at a different stage; and
synthesizing a third image of the second stage of the plurality of sequential creation stages based on the first image and propagation by forward transformation of the variation of the first image to the third image.

17. The computer-readable storage device of claim 16, wherein the instructions that, when executed, further cause the one or more processors to perform operations comprising:

computing, based on the variation of the first image from the stage-specific latent representation, a transformation parameter for an adaptive instance normalization layer of a generation network.

18. The computer-readable storage device of claim 17, wherein the synthesizing comprises modulating feature activations of the generation network through the adaptive instance normalization layer with the transformation parameter to synthesize the third image of the second stage.

19. The computer-readable storage device of claim 16, wherein the instructions that, when executed, further cause the one or more processors to perform operations comprising:

mitigating a memorization of the stage-specific latent representation of the second image at the second stage by applying a weight decay regularization model with a learned hyper-parameter.

20. The computer-readable storage device of claim 16, wherein the instructions that, when executed, further cause the one or more processors to perform operations comprising:

selecting another variation from the another stage-specific latent representation of the type of images; and synthesizing, based on the third image and the another variation from the another stage-specific latent representation, a fourth image of a third stage of the plurality of sequential creation stages.

\* \* \* \* \*